(12) United States Patent
Tang et al.

(10) Patent No.: US 10,104,685 B2
(45) Date of Patent: Oct. 16, 2018

(54) SYSTEM INFORMATION SCHEDULING METHOD AND APPARATUS

(71) Applicant: Huawei Technologies Co., Ltd., Shenzhen, Guangdong (CN)

(72) Inventors: Zhenfei Tang, Shanghai (CN); Yongxia Lyu, Beijing (CN); Jing Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 156 days.

(21) Appl. No.: 14/818,079

(22) Filed: Aug. 4, 2015

(65) Prior Publication Data

US 2015/0341957 A1    Nov. 26, 2015

Related U.S. Application Data

(63) Continuation of application No. PCT/CN2013/071455, filed on Feb. 6, 2013.

(51) Int. Cl.
*H04W 4/00* (2018.01)
*H04W 72/12* (2009.01)
*H04W 48/12* (2009.01)

(52) U.S. Cl.
CPC ....... *H04W 72/1289* (2013.01); *H04W 48/12* (2013.01)

(58) Field of Classification Search
USPC .................. 370/252, 328, 329, 230, 330
See application file for complete search history.

(56) References Cited

U.S. PATENT DOCUMENTS 9,258,094 B2 * 2/2016 Kang ................... H04L 5/0051
2010/0165847 A1    7/2010 Kamuf et al.
(Continued)

FOREIGN PATENT DOCUMENTS

CN    101998295 A    3/2011
CN    102143596 A    8/2011
(Continued)

OTHER PUBLICATIONS

"Impact of bandwidth reduction on low-cost MTC UE procedures", Samsung, 3GPP TSG RAN WG1 #68bis, Mar. 26-30, 2012, 3 pages, R1-121654.
(Continued)

*Primary Examiner* — Kwang B Yao
*Assistant Examiner* — Nguyen Ngo

(57) ABSTRACT

The present invention provides a information processing method at a terminal or a base station. The method at the terminal includes: receiving scheduling information of a physical downlink shared channel (PDSCH) carrying system information, the scheduling information of the PDSCH carried in a master information block (MIB) or downlink control information on an enhanced physical downlink control channel (EPDCCH) sent from the base station, wherein the scheduling information of the PDSCH is used for determining at least one kind of transmission information of the PDSCH; determining the transmission information of the PDSCH according to the scheduling information of the PDSCH. In this way, an extra overhead of a control instruction when a PDCCH is used to schedule a SIB in the prior art is reduced.

4 Claims, 7 Drawing Sheets

(56) References Cited

U.S. PATENT DOCUMENTS

| | | |
|---|---|---|
| 2011/0073627 A1 | 3/2011 | Iida et al. |
| 2012/0039285 A1* | 2/2012 | Seo ................... H04L 1/1671 370/329 |
| 2012/0322483 A1* | 12/2012 | Ji ............................ H04L 5/00 455/509 |
| 2012/0327895 A1 | 12/2012 | Wallen et al. |
| 2013/0083753 A1* | 4/2013 | Lee ................. H04W 72/0453 370/329 |
| 2013/0242770 A1* | 9/2013 | Chen ............... H04W 28/0268 370/252 |
| 2013/0242947 A1* | 9/2013 | Chen .................... H04W 72/04 370/335 |
| 2013/0308572 A1* | 11/2013 | Sayana ............... H04W 72/048 370/329 |
| 2013/0315159 A1* | 11/2013 | Xia ..................... H04W 72/042 370/329 |
| 2013/0343307 A1* | 12/2013 | Desai ................... H04W 74/04 370/329 |
| 2014/0036810 A1* | 2/2014 | Harrison ............. H04W 72/042 370/329 |
| 2014/0098761 A1* | 4/2014 | Lee .................... H04W 74/006 370/329 |
| 2014/0192734 A1* | 7/2014 | Ng ........................ H04L 5/0035 370/329 |
| 2014/0198733 A1* | 7/2014 | Yin ................... H04W 72/0446 370/329 |
| 2015/0173054 A1* | 6/2015 | Ohta ................... H04W 72/042 370/329 |

FOREIGN PATENT DOCUMENTS

| | | |
|---|---|---|
| CN | 102273307 A | 12/2011 |
| WO | 2010051209 A1 | 5/2010 |
| WO | WO 2013/026414 A1 | 2/2013 |

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP TS 36.213 V11.1.0, Dec. 2012, 160 pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, Dec. 2012, 340 pages.

* cited by examiner

SYSTEM INFORMATION SCHEDULING METHOD AND APPARATUS

CROSS REFERENCE TO RELATED APPLICATIONS

This application is a continuation of International Application No. PCT/CN2013/071455, filed on Feb. 6, 2013, which is hereby incorporated by reference in its entirety.

TECHNICAL FIELD

The present invention relates to communications technologies, and in particular, to a system information scheduling method and apparatus.

BACKGROUND

Orthogonal frequency division multiple access (Orthogonal Frequency Division Multiple Access, hereinafter referred to as OFDMA) becomes system key multiple access of a 3G system and/or a 4G system, and is a downlink multiple access technology used in a Long Term Evolution (Long Term Evolution, hereinafter referred to as LTE)/Long Term Evolution-Advanced (LTE-Advanced, hereinafter referred to as LTE-A) system. In terms of time, one radio frame is 10 ms in length, including 10 subframes; each subframe is 1 ms in length, and each subframe includes two timeslots, where each timeslot includes seven (in a case of normal cyclic prefix (Cyclic Prefix, hereinafter referred to as CP)) or six (in a case of extended CP) orthogonal frequency division multiple (Orthogonal Frequency Division Multiple, hereinafter referred to as OFDM) symbols. In terms of frequency, the radio frame is formed by multiple subcarriers, where one subcarrier corresponding to one OFDM symbol is referred to as one resource element (Resource Element, hereinafter referred to as RE). Twelve subcarriers and one timeslot form one resource block (Resource Block, hereinafter referred to as RB). A resource block is classified into a physical resource block (Physical Resource Block, hereinafter referred to as PRB) and a virtual resource block (Virtual Resource Block, hereinafter referred to as VRB). A PRB indicates a location of an actual frequency of a resource block, and a VRB is a form of a renumbered PRB, that is, information is mapped to the PRB by using the VRB. System information required by a terminal is transmitted on these time-frequency resources. The system information includes public information of a serving cell or multiple cells; and the public information is transmitted by using a master information block (Master Information Block, hereinafter referred to as MIB) or a system information block (System Information Block, hereinafter referred to as SIB), where SIBs may be system information blocks that are of different types and are used to transmit different public information, for example, a SIB 1, a SIB 2, and a SIB 3, and all these SIBs are system information.

In the prior art, a MIB is borne on a physical broadcast channel (Physical Broadcast Channel, hereinafter referred to as PBCH) for transmission, and a SIB is borne on a physical downlink shared channel (Physical Downlink Shared Channel, hereinafter referred to as PDSCH) for transmission. Generally, when system information needs to be transmitted, a SIB in a subframe where a physical downlink control channel (Physical Downlink Control Channel, hereinafter referred to as PDCCH) locates, is scheduled by using a public search area of the PDCCH, that is, a cyclic redundancy check (Cyclic Redundancy Check, hereinafter referred to as CRC) code of the PDCCH is scrambled by using a system information radio network temporary identity (System Information Ratio Network temporary Identity, hereinafter referred to as SI-RNTI), which indicates that a PDSCH scheduled by the PDCCH is used to transmit the system information; meanwhile, the PDCCH indicates, by using downlink control information, resource block allocation information and a modulation and coding mode of a PDSCH that corresponds to the system information, so as to transmit the system information by using the PDSCH, where the resource allocation information indicates a time-frequency resource of the PDSCH that corresponds to the system information, and a maximum of the time-frequency resource may reach an total downlink system bandwidth.

It can be learned that in the prior art, when system information needs to be transmitted, a PDCCH needs to use downlink control information to schedule a PDSCH corresponding to the system information; however, a control instruction of the PDCCH causes an extra overhead, and an overhead of the PDCCH is relatively large. Therefore, a waste of the control instruction of the PDCCH may be caused in the prior art.

SUMMARY

Embodiments of the present invention provide a system information scheduling method and apparatus, so as to reduce an extra overhead of a control instruction when a PDCCH is used to schedule a SIB in the prior art, and meanwhile, improve robustness of transmitting scheduling information in a communications system.

According to a first aspect, an embodiment of the present invention provides a system information scheduling method, including:

receiving a first message sent by a base station, where the first message includes a master information block MIB or downlink control information;

determining, according to the first message, scheduling information of a physical downlink shared channel PDSCH corresponding to the first message, where the scheduling information includes scheduling information of a PDSCH corresponding to system information, the scheduling information being in the MIB, or includes scheduling information of a PDSCH corresponding to system information, the scheduling information being in the downlink control information; and the scheduling information is used to determine transmission information of the PDSCH corresponding to the system information;

determining, according to the scheduling information, the transmission information of the PDSCH corresponding to the system information, where the transmission information includes at least one of the following information: whether the system information exists, a transmission subframe of the system information, a modulation and coding mode of the PDSCH corresponding to the system information, and resource allocation information of the PDSCH corresponding to system information; and receiving the system information according to the transmission information of the PDSCH corresponding to the system information.

With reference to the first aspect, in a first possible implementation manner of the first aspect, the method further includes:

reporting, to the base station, a maximum bandwidth supported by a terminal; or configuring, by predefining in a protocol, a maximum bandwidth supported by a terminal; or receiving a maximum bandwidth that is supported by a terminal and is configured by the base station.

With reference to the first aspect, in a second possible implementation manner of the first aspect, the system information includes a first system information block SIB.

With reference to the first aspect or the first possible implementation manner of the first aspect, in a third possible implementation manner of the first aspect, the determining, according to the scheduling information, the transmission information of the PDSCH corresponding to the system information includes:

determining, according to the scheduling information and the maximum bandwidth that is supported by the terminal, the resource allocation information of the PDSCH corresponding to the system information.

With reference to the third possible implementation manner of the first aspect, in a fourth possible implementation manner of the first aspect, the determining, according to the scheduling information and the maximum bandwidth that is supported by the terminal, the resource allocation information of the PDSCH corresponding to the system information includes:

determining a resource allocation unit according to the maximum bandwidth supported by the terminal, where the resource allocation unit is used to determine a quantity of resource block groups RBGs; and determining, according to the scheduling information and the resource allocation unit, the resource allocation information of the PDSCH corresponding to the system information.

With reference to the third possible implementation manner of the first aspect, in a fifth possible implementation manner of the first aspect, the determining, according to the scheduling information and the maximum bandwidth that is supported by the terminal, the resource allocation information of the PDSCH corresponding to the system information includes:

determining, according to the scheduling information, the maximum bandwidth supported by the terminal, and a cell identifier, the resource allocation information of the PDSCH corresponding to the system information.

With reference to the first aspect or the first possible implementation manner of the first aspect, in a sixth possible implementation manner of the first aspect, the receiving the MIB or the downlink control information sent by the base station includes:

determining, according to the maximum bandwidth supported by the terminal, an aggregation level of a physical downlink control channel PDCCH that bears the downlink control information or an aggregation level of an enhanced physical downlink control channel EPDCCH that bears the downlink control information; and monitoring the PDCCH candidate or an EPDCCH candidate at the determined aggregation level, and receiving the downlink control information on the PDCCH or the downlink control information on the EPDCCH.

With reference to the sixth possible implementation manner of the first aspect, in a seventh possible implementation manner of the first aspect, the aggregation level includes the maximum bandwidth supported by the terminal or an integral multiple of the maximum bandwidth supported by the terminal.

With reference to the first aspect, in an eighth possible implementation manner of the first aspect, the determining, according to the scheduling information, the transmission information of the PDSCH corresponding to the system information includes:

determining, according to the scheduling information, transmission subframe location configuration of the system information and transmission subframe period configuration of the system information, where the transmission subframe configuration of the system information is used to indicate a radio frame and a subframe location for transmitting the system information, and the transmission subframe period configuration of the system information is used to indicate a transmission subframe period of the system information; and determining the transmission subframe of the system information according to the transmission subframe location configuration of the system information and the transmission subframe period configuration of the system information.

With reference to the eighth possible implementation manner of the first aspect, in a ninth possible implementation manner of the first aspect, the determining the transmission subframe of the system information according to the transmission subframe location configuration of the system information and the transmission subframe period configuration of the system information includes: determining the transmission subframe of the system information according to a maximum bandwidth supported by the terminal, the transmission subframe location configuration of the system information, and the transmission subframe period configuration of the system information.

With reference to the first aspect, in a tenth possible implementation manner of the first aspect, the determining, according to the scheduling information, the transmission information of the PDSCH corresponding to the system information includes:

determining, according to the scheduling information and a set of modulation and coding modes of the PDSCH corresponding to the system information, the modulation and coding mode of the PDSCH corresponding to the system information, where the set of modulation and coding modes of the PDSCH corresponding to the system information is a subset of a set of modulation and coding modes of a PDSCH.

With reference to the eighth possible implementation manner of the first aspect, in an eleventh possible implementation manner of the first aspect, the transmission subframe location configuration of the system information includes:

a subframe 5 in an even-numbered radio frame; or a subframe 5 and a subframe 6 that are in an even-numbered radio frame; or a subframe 5, a subframe 6, a subframe 7, and a subframe 8 that are in an even-numbered radio frame.

With reference to the second possible implementation manner of the first aspect, in a twelfth possible implementation manner of the first aspect, the determining, according to the scheduling information, the transmission information of the PDSCH corresponding to the system information includes:

determining, according to the scheduling information, whether the first SIB exists.

According to a second aspect, the present invention provides a system information scheduling method, including:

sending a first message to a terminal, where the first message includes: a master information block MIB or downlink control information, the MIB or the downlink control information carries scheduling information of a physical downlink shared channel PDSCH corresponding to system information, and the scheduling information is used to determine transmission information of the PDSCH corresponding to the system information;

determining, according to the scheduling information, the transmission information of the PDSCH corresponding to the system information, where the transmission information includes at least one of the following information: whether the system information exists, a transmission subframe of the system information, a modulation and coding mode of the system information, and resource allocation information of the PDSCH corresponding to the system information; and sending the system information according to the transmission information of the PDSCH corresponding to the system information.

With reference to the second aspect, in a first possible implementation manner of the second aspect, the method further includes:

receiving a maximum bandwidth that is supported by the terminal and is reported by the terminal; or configuring, by predefining in a protocol, a maximum bandwidth supported by the terminal; or configuring, for the terminal, a maximum bandwidth supported by the terminal.

With reference to the second aspect, in a second possible implementation manner of the second aspect, the system information includes a first system information block SIB.

With reference to the second aspect or the first possible implementation manner of the second aspect, in a third possible implementation manner of the second aspect, the determining, according to the scheduling information, the transmission information of the PDSCH corresponding to the system information includes:

determining, according to the scheduling information and the maximum bandwidth that is supported by the terminal, the resource allocation information of the PDSCH corresponding to the system information.

With reference to the third possible implementation manner of the second aspect, in a fourth possible implementation manner of the second aspect, the determining, according to the scheduling information and the maximum bandwidth that is supported by the terminal, the resource allocation information of the PDSCH corresponding to the system information includes:

determining a resource allocation unit according to the maximum bandwidth supported by the terminal, where the resource allocation unit is used to determine a quantity of resource block groups RBGs; and determining, according to the scheduling information and the resource allocation unit, the resource allocation information of the PDSCH corresponding to the system information.

With reference to the third possible implementation manner of the second aspect, in a fifth possible implementation manner of the second aspect, the determining, according to the scheduling information and the maximum bandwidth that is supported by the terminal, the resource allocation information of the PDSCH corresponding to the system information includes:

determining, according to the scheduling information, the maximum bandwidth supported by the terminal, and a cell identifier, the resource allocation information of the PDSCH corresponding to the system information.

With reference to the second aspect or the second possible implementation manner of the second aspect, in a sixth possible implementation manner of the second aspect, when the first message includes the downlink control information, the sending a first message to a terminal includes:

determining, according to the maximum bandwidth supported by the terminal, an aggregation level of a physical downlink control channel PDCCH that bears the downlink control information or an aggregation level of an enhanced physical downlink control channel EPDCCH that bears the downlink control information; and determining, according to the determined aggregation level, at least one PDCCH candidate corresponding to the aggregation level or at least one EPDCCH candidate corresponding to the aggregation level, and sending the downlink control information on the at least one PDCCH candidate corresponding to the aggregation level or the at least one EPDCCH candidate corresponding to the aggregation level.

With reference to the sixth possible implementation manner of the second aspect, in a seventh possible implementation manner of the second aspect, the aggregation level includes the maximum bandwidth supported by the terminal or an integral multiple of the maximum bandwidth supported by the terminal.

With reference to the second aspect, in an eighth possible implementation manner of the second aspect, the determining, according to the scheduling information, the transmission information of the PDSCH corresponding to the system information includes:

determining, according to the scheduling information, transmission subframe location configuration of the system information and transmission subframe period configuration of the system information, where the transmission subframe location configuration of the system information is used to indicate a radio frame and a subframe location for transmitting the system information, and the transmission subframe period configuration of the system information is used to indicate a transmission subframe period of the system information; and determining the transmission subframe of the system information according to the transmission subframe location configuration of the system information and the transmission subframe period configuration of the system information.

With reference to the eighth possible implementation manner of the second aspect, in a ninth possible implementation manner of the second aspect, the determining the transmission subframe of the system information according to the transmission subframe location configuration of the system information and the transmission subframe period configuration of the system information includes: determining the transmission subframe of the system information according to a maximum bandwidth supported by the terminal, the transmission subframe location configuration of the system information, and the transmission subframe period configuration of the system information.

With reference to the second aspect, in a tenth possible implementation manner of the second aspect, the determining, according to the scheduling information, the transmission information of the PDSCH corresponding to the system information includes:

determining, according to the scheduling information and a set of modulation and coding modes of the PDSCH corresponding to the system information, the modulation and coding mode of the PDSCH corresponding to the system information, where the set of modulation and coding modes of the PDSCH corresponding to the system information is a subset of a set of modulation and coding modes of a PDSCH.

With reference to the eighth possible implementation manner of the second aspect, in an eleventh possible implementation manner of the second aspect, the transmission subframe location configuration of the system information includes: a subframe 5 in an even-numbered radio frame; or a subframe 5 and a subframe 6 that are in an even-numbered radio frame; or a subframe 5, a subframe 6, a subframe 7, and a subframe 8 that are in an even-numbered radio frame.

With reference to the second possible implementation manner of the second aspect, in a twelfth possible implementation manner of the second aspect, the determining, according to the scheduling information, the transmission information of the PDSCH corresponding to the system information includes:

determining, according to the scheduling information, whether the first SIB exists.

According to a third aspect, an embodiment of the present invention provides a system information scheduling apparatus, including:

a first receiving module, configured to receive a first message sent by a base station, where the first message includes a master information block MIB or downlink control information;

a scheduling information determining module, configured to determine, according to the first message, scheduling information of a physical downlink shared channel PDSCH corresponding to the first message, where the scheduling information includes scheduling information of a PDSCH corresponding to system information in the MIB, or includes scheduling information of a PDSCH corresponding to system information in the downlink control information; and the scheduling information is used to determine transmission information of the PDSCH corresponding to the system information;

a transmission information determining module, configured to determine, according to the scheduling information, the transmission information of the PDSCH corresponding to the system information, where the transmission information includes at least one of the following information: whether the system information exists, information about a transmission subframe of the system information, a modulation and coding mode of the system information, and resource allocation information of the PDSCH corresponding to the system information; and a second receiving module, configured to receive the system information on the PDSCH according to the scheduling information.

With reference to the third aspect, in a first possible implementation manner of the third aspect, the apparatus further includes:

a reporting module, configured to report, to the base station, a maximum bandwidth supported by a terminal; or a predefinition module, configured to configure, by predefining in a protocol, a maximum bandwidth supported by a terminal; or a third receiving module, configured to receive a maximum bandwidth that is supported by a terminal and is configured by the base station.

With reference to the third aspect, in a second possible implementation manner of the third aspect, the system information includes a first system information block SIB.

With reference to the third aspect or the first possible implementation manner of the third aspect, in a third possible implementation manner of the third aspect, the transmission information determining module includes:

a first determining unit, configured to determine, according to the scheduling information and the maximum bandwidth that is supported by the terminal, the resource allocation information of the PDSCH corresponding to the system information.

With reference to the third possible implementation manner of the third aspect, in a fourth possible implementation manner of the third aspect, the first determining unit is specifically configured to determine a resource allocation unit according to the maximum bandwidth supported by the terminal, where the resource allocation unit is used to determine a quantity of resource block groups RBGs; and determine, according to the scheduling information and the resource allocation unit, the resource allocation information of the PDSCH corresponding to the system information.

With reference to the third possible implementation manner of the third aspect, in a fifth possible implementation manner of the third aspect, the first determining unit is specifically configured to determine, according to the scheduling information, the maximum bandwidth supported by the terminal, and a cell identifier, the resource allocation information of the PDSCH corresponding to the system information.

With reference to the third aspect or the first possible implementation manner of the third aspect, in a sixth possible implementation manner of the third aspect, the first receiving module includes:

an aggregation level determining unit, configured to determine, according to the maximum bandwidth supported by the terminal, an aggregation level of a physical downlink control channel PDCCH that bears the downlink control information or an aggregation level of an enhanced physical downlink control channel EPDCCH that bears the downlink control information; and a monitoring unit, configured to monitor the PDCCH candidate or an EPDCCH candidate at the determined aggregation level, and receive the downlink control information on the PDCCH or the downlink control information on the EPDCCH.

With reference to the sixth possible implementation manner of the third aspect, in a seventh possible implementation manner of the third aspect, the aggregation level includes the maximum bandwidth supported by the terminal or an integral multiple of the maximum bandwidth supported by the terminal.

With reference to the third aspect, in an eighth possible implementation manner of the third aspect, the transmission information determining module includes:

a second determining unit, configured to determine, according to the scheduling information, transmission subframe location configuration of the system information and transmission subframe period configuration of the system information, where the transmission subframe location configuration of the system information is used to indicate a radio frame and a subframe location for transmitting the system information, and the transmission subframe period configuration of the system information is used to indicate a transmission subframe period of the system information; and determine the transmission subframe of the system information according to the transmission subframe location configuration of the system information and the transmission subframe period configuration of the system information.

With reference to the eighth possible implementation manner of the third aspect, in a ninth possible implementation manner of the third aspect, the second determining unit is specifically configured to determine the transmission subframe of the system information according to a maximum bandwidth supported by a terminal, the transmission subframe location configuration of the system information, and the transmission subframe period configuration of the system information.

With reference to the third aspect, in a tenth possible implementation manner of the third aspect, the transmission information determining module includes:

a third determining unit, configured to determine, according to the scheduling information and a set of modulation and coding modes of the PDSCH corresponding to the system information, the modulation and coding mode of the PDSCH corresponding to the system information; where the set of modulation and coding modes of the PDSCH corresponding to the system information is a subset of a set of modulation and coding modes of a PDSCH.

With reference to the eighth possible implementation manner of the third aspect, in an eleventh possible implementation manner of the third aspect, the transmission subframe location configuration of the system information includes: a subframe 5 in an even-numbered radio frame; or a subframe 5 and a subframe 6 that are in an even-numbered radio frame; or a subframe 5, a subframe 6, a subframe 7, and a subframe 8 that are in an even-numbered radio frame.

With reference to the second possible implementation manner of the third aspect, in a twelfth possible implementation manner of the third aspect, the transmission information determining module includes:

a fourth determining unit, configured to determine, according to the scheduling information, whether the first SIB exists.

According to a fourth aspect, an embodiment of the present invention provides a system information scheduling apparatus, including:

a first sending module, configured to send a first message to a terminal, where the first message includes: a master information block MIB or downlink control information, the MIB or the downlink control information carries scheduling information of a physical downlink shared channel PDSCH corresponding to system information, and the scheduling information is used to determine transmission information of the PDSCH corresponding to system information;

a determining module, configured to determine, according to the scheduling information, the transmission information of the PDSCH corresponding to the system information, where the transmission information includes at least one of the following information: whether the system information exists, a transmission subframe of the system information, a modulation and coding mode of the system information, and resource allocation information of the PDSCH corresponding to the system information; and a second sending module, configured to send the system information on the PDSCH according to the scheduling information.

With reference to the fourth aspect, in a first possible implementation manner of the fourth aspect, the apparatus further includes:

a receiving module, configured to receive a maximum bandwidth that is supported by the terminal and is reported by the terminal; or a predefinition module, configured to configure, by predefining in a protocol, a maximum bandwidth supported by the terminal; or a configuration module, configured to configure, for the terminal, a maximum bandwidth supported by the terminal.

With reference to the fourth aspect, in a second possible implementation manner of the fourth aspect, the system information includes a first system information block SIB.

With reference to the fourth aspect or the first possible implementation manner of the fourth aspect, in a third possible implementation manner of the fourth aspect, the determining module includes:

a resource allocation information determining unit, configured to determine, according to the scheduling information and the maximum bandwidth that is supported by the terminal, the resource allocation information of the PDSCH corresponding to the system information.

With reference to the third possible implementation manner of the fourth aspect, in a fourth possible implementation manner of the fourth aspect, the resource allocation information determining unit is specifically configured to determine a resource allocation unit according to the maximum bandwidth supported by the terminal, where the resource allocation unit is used to determine a quantity of resource block groups RBGs; and determine, according to the scheduling information and the resource allocation unit, the resource allocation information of the PDSCH corresponding to the system information.

With reference to the third possible implementation manner of the fourth aspect, in a fifth possible implementation manner of the fourth aspect, the resource allocation information determining unit is specifically configured to determine, according to the scheduling information, the maximum bandwidth supported by the terminal, and a cell identifier, the resource allocation information of the PDSCH corresponding to the system information.

With reference to the fourth aspect or the first possible implementation manner of the fourth aspect, in a sixth possible implementation manner of the fourth aspect, the first sending module includes:

an aggregation level determining unit, configured to determine, according to the maximum bandwidth supported by the terminal, an aggregation level of a physical downlink control channel PDCCH that bears the downlink control information or an aggregation level of an enhanced physical downlink control channel EPDCCH that bears the downlink control information; and a candidate determining unit, configured to determine, according to the determined aggregation level, at least one PDCCH candidate corresponding to the aggregation level or at least one EPDCCH candidate corresponding to the aggregation level, and send the downlink control information on the at least one PDCCH candidate corresponding to the aggregation level or the at least one EPDCCH candidate corresponding to the aggregation level.

With reference to the sixth possible implementation manner of the fourth aspect, in a seventh possible implementation manner of the fourth aspect, the aggregation level includes the maximum bandwidth supported by the terminal or an integral multiple of the maximum bandwidth supported by the terminal.

With reference to the fourth aspect, in an eighth possible implementation manner of the fourth aspect, the determining module includes:

a transmission subframe determining unit, configured to determine, according to the scheduling information, transmission subframe location configuration of the system information and transmission subframe period configuration of the system information, where the transmission subframe location configuration of the system information is used to indicate a radio frame and a subframe location for transmitting the system information, and the transmission subframe period configuration of the system information is used to indicate a transmission subframe period of the system information; and determine the transmission subframe of the system information according to the transmission subframe location configuration of the system information and the transmission subframe period configuration of the system information.

With reference to the eighth possible implementation manner of the fourth aspect, in a ninth possible implementation manner of the fourth aspect, the transmission subframe determining unit is specifically configured to determine the transmission subframe of the system information according to a maximum bandwidth supported by the terminal, the transmission subframe location configuration of the system information, and the transmission subframe period configuration of the system information.

With reference to the fourth aspect, in a tenth possible implementation manner of the fourth aspect, the determining module includes:

a modulation and coding mode determining unit, configured to determine, according to the scheduling information and a set of modulation and coding modes of the PDSCH corresponding to the system information, the modulation and coding mode of the PDSCH corresponding to the system information, where the set of modulation and coding modes of the PDSCH corresponding to the system information is a subset of a set of modulation and coding modes of a PDSCH.

With reference to the eighth possible implementation manner of the fourth aspect, in an eleventh possible implementation manner of the fourth aspect, the transmission subframe configuration of the system information includes:

a subframe 5 in an even-numbered radio frame; or a subframe 5 and a subframe 6 that are in an even-numbered radio frame; or a subframe 5, a subframe 6, a subframe 7, and a subframe 8 that are in an even-numbered radio frame.

With reference to the second possible implementation manner of the fourth aspect, in a twelfth possible implementation manner of the fourth aspect, the determining module includes:

a first SIB determining unit, configured to determine, according to the scheduling information, whether the first SIB exists.

In the method provided in the embodiments, a terminal receives a MIB or downlink control information sent by a base station, to determine scheduling information, further scheduling of system information is implemented by using the scheduling information, that is, transmission information of a PDSCH corresponding to the system information is determined by using the scheduling information, and then the system information is transmitted. In this way, an extra overhead of a control instruction when a PDCCH is used to schedule system information in the prior art is reduced, and meanwhile, by using a MIB to transmit scheduling information, robustness of transmitting the scheduling information is improved.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
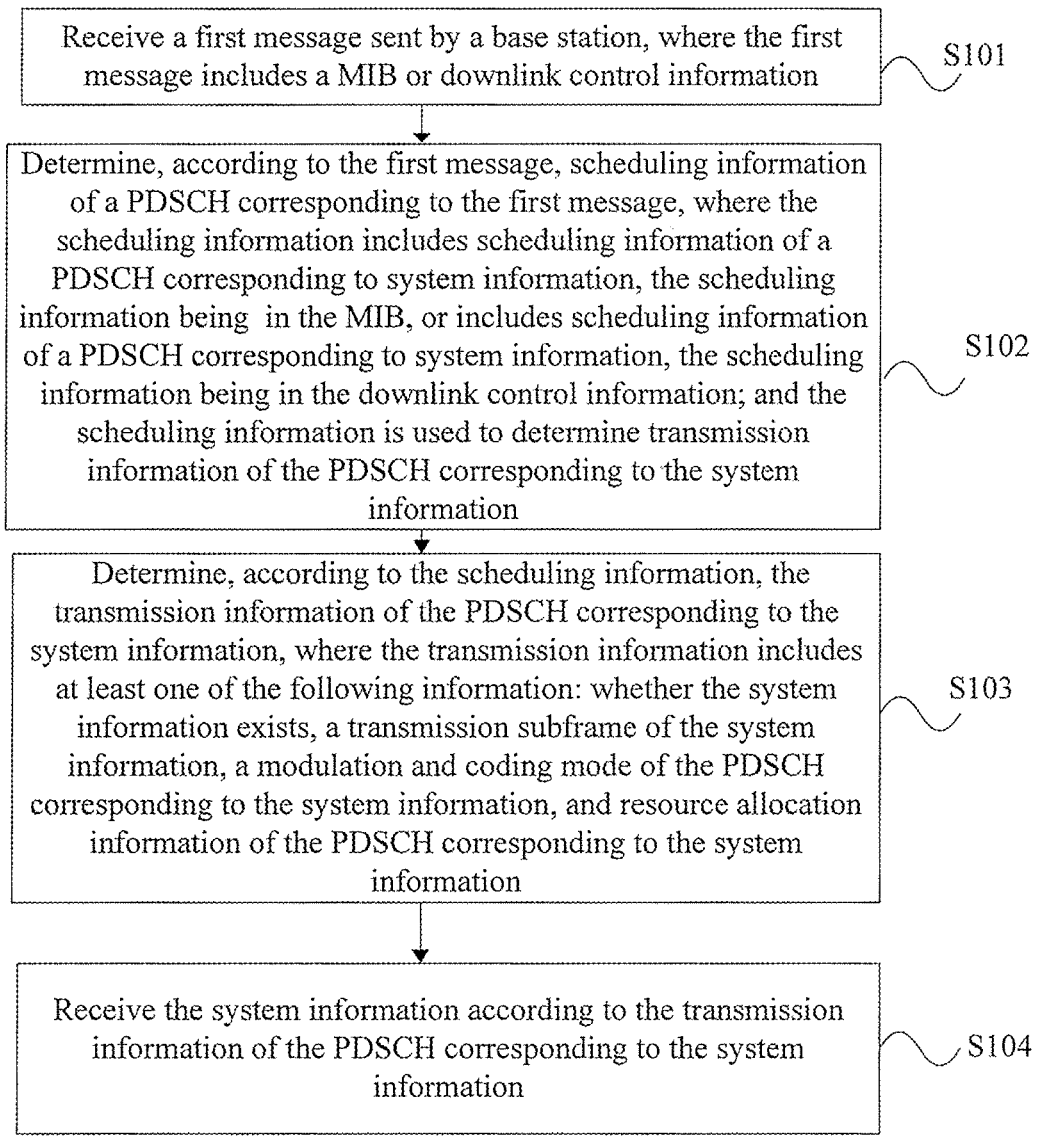
FIG. 1 is a schematic flowchart of Embodiment 1 of a system information scheduling method according to the present invention.

FIG. 1 is a schematic flowchart of Embodiment 1 of a system information scheduling method according to the present invention. The method in this embodiment is executed by a terminal. The method in this embodiment includes the following steps:

S101: Receive a first message sent by a base station, where the first message includes a MIB or downlink control information.

S102: Determine, according to the first message, scheduling information of a PDSCH corresponding to the first message, where the scheduling information includes scheduling information of a PDSCH corresponding to system information, the scheduling information being in the MIB, or includes scheduling information of a PDSCH corresponding to system information, the scheduling information being in the downlink control information; and the scheduling information is used to determine transmission information of the PDSCH corresponding to the system information.

S103: Determine, according to the scheduling information, the transmission information of the PDSCH corresponding to the system information, where the transmission information includes at least one of the following information: whether the system information exists, a transmission subframe of the system information, a modulation and coding mode of the PDSCH corresponding to the system information, and resource allocation information of the PDSCH corresponding to the system information.

S104: Receive the system information according to the transmission information of the PDSCH corresponding to the system information.

Specifically, the system information includes public information of a local cell or multiple cells, and the system information is transmitted by using MIBs or SIBs, where the SIBs may be different types of system information blocks, for example, a first SIB and a second SIB, that are used to transmit different public information, and all these SIBs are system information. In this embodiment of the present invention, a SIB used for scheduling may be the first SIB. The foregoing MIB is used to transmit system information.

The downlink control information may be borne on a PDCCH, or may be borne on an EPDCCH, that is, either the PDCCH or the EPDCCH may bear the downlink control information to instruct a corresponding PDSCH to transmit the system information.

Generally, when system information needs to be transmitted, a SIB in a subframe in which a PDCCH is located is scheduled by using a public search area of the PDCCH, that is, a CRC of the PDCCH is scrambled by using an SI-RNTI, which indicates that a PDSCH scheduled by the PDCCH is used to transmit the system information; meanwhile, the PDCCH indicates, by using downlink control information, resource block allocation information and a modulation and coding mode of a PDSCH that corresponds to the system information, so as to transmit the system information by using the PDSCH, where the resource allocation information indicates a time-frequency resource of the PDSCH that corresponds to the system information, and a maximum of the time-frequency resource may reach an total downlink system bandwidth. Therefore, it can be learned that in the prior art, when system information needs to be transmitted, a PDCCH needs to use downlink control information to schedule a PDSCH corresponding to the system information; however, a control instruction of the PDCCH causes an extra overhead, and an overhead of the PDCCH is relatively large; for some MTC users, the control instruction of the PDCCH may usually be reduced or even removed, that is, it is not required or seldom required to use the PDCCH to schedule the PDSCH.

In this embodiment of the present invention, the terminal receives the first message sent by the base station, where the first message includes the MIB or the downlink control information; the terminal determines, according to the first message, the scheduling information of the PDSCH corresponding to the first message, where the scheduling information includes the scheduling information of the PDSCH corresponding to the system information, the scheduling information being in the MIB, or includes the scheduling information of the PDSCH corresponding to the system information, the scheduling information being in the downlink control information; the scheduling information is used to determine the transmission information of the PDSCH corresponding to the system information; and the system information may be cell-level information that has a cell identification identifier and is public information for a user entering a cell, that is, the system information carries the public information of a local cell or multiple cells; and the terminal determines, according to the determined scheduling information, the transmission information of the PDSCH corresponding to the system information, where the transmission information may be at least one of the following information: whether the system information exists, the transmission subframe of the system information, the modulation and coding mode of the PDSCH corresponding to the system information, and the resource allocation information of the PDSCH corresponding to the system information.

After the terminal determines, according to the scheduling information, the transmission information of the PDSCH corresponding to the system information, the terminal receives, according to the determined transmission information of the PDSCH corresponding to the system information, the system information sent by the base station.

In the method provided in this embodiment, a terminal receives a MIB or downlink control information sent by a base station, to determine scheduling information, further scheduling of system information is implemented by using the scheduling information, that is, transmission information of a PDSCH corresponding to the system information is determined by using the scheduling information, and then the system information is transmitted. In this way, an extra overhead of a control instruction when a PDCCH is used to schedule system information in the prior art is reduced, and meanwhile, by using a MIB to transmit scheduling information, robustness of transmitting the scheduling information is improved.

In Embodiment 2 of the present invention, on the basis of the embodiment shown in FIG. 1, preferably, the determining, according to the scheduling information, the transmission information of the PDSCH corresponding to the system information includes: determining, according to the scheduling information and a maximum bandwidth that is supported by the terminal, the resource allocation information of the PDSCH corresponding to the system information.

Specifically, the terminal reports, to the base station, the maximum bandwidth supported by the terminal; or the terminal may configure, by predefining in a protocol, the maximum bandwidth supported by the terminal; or the terminal may receive the maximum bandwidth that is supported by the terminal and is configured by the base station. The terminal determines, according to the scheduling information and the maximum bandwidth that can be supported by the terminal, the resource allocation information of the PDSCH corresponding to the system information, where the system information may be cell-level information that has a cell identification identifier and is public information for a user entering a cell, that is, the system information carries public information of a local cell or multiple cells.

On the basis that the terminal learns the maximum bandwidth supported by the terminal, the terminal determines, according to the scheduling information, the transmission information of the PDSCH corresponding to the system information, that is, determines, according to the scheduling information and the maximum bandwidth that is supported by the terminal, the resource allocation information of the PDSCH corresponding to the system information, that is, determines the system information is specifically transmitted on which resources of the corresponding PDSCH.

In Embodiment 3 of the present invention, on the basis of Embodiment 2, preferably, the determining, according to the scheduling information and a maximum bandwidth that is supported by the terminal, the resource allocation information of the PDSCH corresponding to the system information includes: determining a resource allocation unit according to the maximum bandwidth supported by the terminal, where the resource allocation unit is used to determine a quantity of resource block groups RBGs, and determining, according to the scheduling information and the resource allocation unit, the resource allocation information of the PDSCH corresponding to the system information.

Specifically, the resource allocation unit is determined according to the maximum bandwidth supported by the terminal, where the resource allocation unit may be less than or equal to the maximum bandwidth supported by the terminal. It should be noted that, in the prior art, a PDCCH is used to schedule a PDSCH, and transmission of scheduling information needs to occupy an total system bandwidth; herein, using a MIB or downlink scheduling information borne on an enhanced physical downlink control channel (Enhanced Physical Downlink Control Channel, hereinafter referred to as EPDCCH) to schedule a PDSCH occupies six RBs or less than six RBs, which may be specifically configured; therefore, by using the MIB or the downlink control information borne on the EPDCCH to schedule the PDSCH, transmission of scheduling information may also support a small bandwidth. Generally, a bandwidth less than 20 MHz may be referred to as a small bandwidth, for example, the small bandwidth may be 1.4 MHz, 3 MHz, 5 MHz, or the like. For example, 180 KHz corresponds to one RB, 1.4 MHz corresponds to six RBs, 3 MHz corresponds to 15 RBs, 5 MHz corresponds to 25 RBs, and 20 MHz corresponds to 100 RBs. Specifically, that the resource allocation unit is six RBs is used as an example. A value of the resource allocation unit may be any RB ranging from one RB to six RBs. Herein, that the resource allocation unit is six RBs is used as an example as follows:

When the maximum bandwidth supported by the terminal is six RBs, a system bandwidth is divided into resource block groups (Resource Block Group, hereinafter referred to as RBG) according to the resource allocation unit, that is, six RBs, and the RBGs are numbered. That the system bandwidth is 50 RBs is used as an example, 50/6 is rounded down to eight RBGs, the eight RBGs are numbered, that is, three bits in the MIB are used to indicate an RBG, on which the system information is transmitted, among the eight RBGs on the PDSCH, and then, the transmission information of the PDSCH corresponding to the system information is determined.

When the maximum bandwidth supported by the terminal is 15 RBs, likewise, a system bandwidth is divided into RBGs according to the resource allocation unit, that is, six RBs, and the RBGs are numbered. That the system bandwidth is 50 RBs is used as an example, 50/6 is rounded down to eight RBGs, the eight RBGs are numbered, that is, four or five bits in the MIB are used to indicate an RBG, on which the system information is transmitted, among the eight RBGs on the PDSCH, and then, the transmission information of the PDSCH corresponding to the system information is determined.

The foregoing manner for determining the transmission information of the PDSCH corresponding to the system information may also be a manner for allocating a resource by using a distributed virtual resource block (Distributed Virtual Resource Block, hereinafter referred to as DVRB), and a quantity of required bits is $\lceil \log_2(\lfloor N_{VRB,gap1}^{DL}/N_{RB}^{step}\rfloor \cdot (\lfloor N_{VRB,gap1}^{DL}/N_{RB}^{step}\rfloor+1)/2) \rceil$, where $N_{VRB,gap1}^{DL}$ is a preset value corresponding to a certain system bandwidth in a protocol, and reference is made to 3GPP TS 36.211; $N_{RB}^{step}$ is 6, that is, that the resource allocation information is six RBs is used as an example, and a quantity of bits obtained by means of calculation based on the foregoing formula is a resource required for transmitting the system information.

In the methods provided in Embodiment 2 and Embodiment 3, a terminal receives a MIB or downlink control information sent by a base station, to determine scheduling information, further specific resource allocation information of a PDSCH corresponding to system information is determined by using the scheduling information and a maximum bandwidth that is supported by the terminal, and then the system information is transmitted. In this way, an extra overhead of a control instruction when a PDCCH is used to schedule system information in the prior art is reduced, meanwhile, by using a MIB to transmit scheduling information, robustness of transmitting the scheduling information is improved, and by using downlink control information in an EPDCCH to schedule the system information, transmission of the scheduling information can support a smaller bandwidth.

In Embodiment 4 of the present invention, on the basis of Embodiment 2, preferably, the determining, according to the scheduling information and a maximum bandwidth that is supported by the terminal, the resource allocation information of the PDSCH corresponding to the system information includes: determining, according to the scheduling information, the maximum bandwidth supported by the terminal, and a cell identifier, the resource allocation information of the PDSCH corresponding to the system information.

Specifically, there may be two implementation manners, which are as follows:

A first implementation manner: The resource allocation information of the PDSCH corresponding to the system information is determined according to the cell identifier, the maximum bandwidth supported by the terminal, and the scheduling information carried in the MIB, where the cell identifier may be a physical cell identifier, or may be a virtual cell identifier. Further, a quantity of RBGs is determined according to the maximum bandwidth supported by the terminal and the scheduling information carried in the MIB. For a specific process of determining the quantity of RBGs, reference is made to Embodiment 3. Then, it is assumed that the quantity of RBGs in this embodiment is the same as that obtained by means of calculation in Embodiment 3, that is, eight RBGs, an odd-numbered cell identifier is used to indicate an RBG 0 to an RBG 3, and an even-numbered cell identifier is used to indicate an RBG 4 to an RBG 7. Herein, two bits in the MIB may be used to indicate a specific RBG, on which the system information is transmitted, among the four RBGs.

A second implementation manner: The resource allocation information of the PDSCH corresponding to the system information is determined according to the cell identifier, the maximum bandwidth supported by the terminal, and the scheduling information carried in the downlink control information, where the cell identifier may be a physical cell identifier, or may be a virtual cell identifier. Further, a quantity of RBGs is determined according to the maximum bandwidth supported by the terminal and the scheduling information carried in the downlink control information. For a specific process of determining the quantity of RBGs, reference is made to Embodiment 3. Then, it is assumed that the quantity of RBGs in this embodiment is the same as that obtained by means of calculation in Embodiment 3, that is, eight RBGs, an odd-numbered cell identifier is used to indicate an RBG 0 to an RBG 3, and an even-numbered cell identifier is used to indicate an RBG 4 to an RBG 7. Herein, two bits in the downlink control information may be used to indicate a specific RBG, on which the system information is transmitted, among the four RBGs.

Specifically, the foregoing RBG may be a physical resource block group, or may be a virtual resource block group. The physical resource block group needs to be determined from the virtual resource block group according to a system frame number, a radio frame number, a subframe number, or a timeslot number; that is, one virtual resource block group corresponds to different physical resource block groups in different system frames, radio frames, subframes, or timeslots, for example, a virtual resource block group 0 indicates a physical resource block group 0 in a system frame with an even-numbered system frame number, and indicates a physical resource block group 3 in a system frame with an odd-numbered frame number.

In the method provided in this embodiment, resource allocation information of a PDSCH corresponding to system information is determined according to scheduling information in a MIB or downlink control information, a maximum bandwidth supported by a terminal, and a cell identifier, and then the system information is transmitted. In this way, an extra overhead of a control instruction when a PDCCH is used to schedule system information in the prior art is reduced, meanwhile, by using a MIB to transmit scheduling information, robustness of transmitting the scheduling information is improved, and by using downlink control information in an EPDCCH to schedule the system information, transmission of the scheduling information can support a smaller bandwidth.

In Embodiment 5 of the present invention, on the basis of Embodiment 1, preferably, the receiving the MIB or the downlink control information sent by the base station includes: determining, according to the maximum bandwidth supported by the terminal, an aggregation level of a physical downlink control channel PDCCH that bears the downlink control information or an aggregation level of an EPDCCH that bears the downlink control information; and monitoring the PDCCH candidate or an EPDCCH candidate at the determined aggregation level, and receiving the downlink control information on the PDCCH or the downlink control information on the EPDCCH, where the aggregation level includes the maximum bandwidth supported by the terminal or an integral multiple of the maximum bandwidth supported by the terminal.

Specifically, the terminal reports, to the base station, the maximum bandwidth supported by the terminal; and the base station receives the maximum bandwidth that is supported by the terminal and is reported by the terminal, and determines, according to the bandwidth, the aggregation level of the PDCCH that bears the downlink control information or the aggregation level of the EPDCCH that bears the downlink control information. An aggregation level of an EPDCCH of a SIB that schedules an MTC is different from an aggregation level of an EPDCCH of a SIB that schedules a non-MTC. The EPDCCH of the SIB that schedules the MTC supports transmission of an EPDCCH whose aggregation level is 6, 12, or 24, that is, the aggregation level of the EPDCCH of the SIB that schedules the MTC includes the maximum bandwidth supported by the terminal or a multiple of the maximum bandwidth supported by the terminal, and is higher than an aggregation level used by a SIB that schedules an MTC in the prior art, that is, one EPDCCH occupies 12 or 24 enhanced control channel units. After determining the aggregation level of the EPDCCH according to the maximum bandwidth supported by the terminal, the base station determines, according to a transmission condition on a channel, an aggregation level at which the downlink control information on the PDCCH or the EPDCCH is transmitted. Likewise, the terminal determines, according to the maximum bandwidth supported by the terminal, the aggregation level of the PDCCH that bears the downlink control information or the aggregation level of the EPDCCH that bears the downlink control information, monitors the PDCCH candidate or the EPDCCH candidate at the determined aggregation level, receives the downlink control information on the PDCCH or the downlink control information on the EPDCCH, and further acquires the scheduling information in the downlink control information; for subsequent processing, reference is made to the foregoing embodiments.

In the method provided in this embodiment, an aggregation level of an EPDCCH that bears downlink control information is determined according to a maximum bandwidth supported by a terminal, and because an aggregation level of an EPDCCH of a SIB that schedules an MTC is higher than an aggregation level in the prior art, robustness of transmitting the SIB in the method of the present embodiment is higher.

In Embodiment 6 of the present invention, on the basis of Embodiment 1, preferably, the determining, according to the scheduling information, the transmission information of the PDSCH corresponding to the system information includes: determining, according to the scheduling information, transmission subframe location configuration of the system information and transmission subframe period configuration of the system information, where the transmission subframe location configuration of the system information is used to indicate a radio frame and a subframe location for transmitting the system information, and the transmission subframe period configuration of the system information is used to indicate a transmission subframe period of the system information; and determining the transmission subframe of the system information according to the transmission subframe location configuration of the system information and the transmission subframe period configuration of the system information.

Specifically, the terminal determines, according to the determined scheduling information, the transmission subframe location configuration of the system information and the transmission subframe period configuration of the system information, which is specifically as follows: the transmission subframe period of the system information may be 40 ms, or may be a multiple of 40 ms; for a specific radio frame and specific subframe location configuration for transmitting the system information, the following cases are predefined according to a protocol: the subframe location that is for transmitting the system information and is determined by using the scheduling information in the MIB or the downlink control information may be a subframe 5 in an even-numbered radio frame, may be a subframe 5 and a subframe 6 that are in an even-numbered radio frame, or may be a subframe 5, a subframe 6, a subframe 7, and a subframe 8 that are in an even-numbered radio frame, that is, the system information is specifically transmitted in a corresponding subframe of the radio frame.

Further, on the basis of Embodiment 6, preferably, the determining the transmission subframe of the system information according to the transmission subframe location configuration of the system information and the transmission subframe period configuration of the system information includes: determining the transmission subframe of the system information according to a maximum bandwidth supported by the terminal, the transmission subframe location configuration of the system information, and the transmission subframe period configuration of the system information.

Similarly, that the maximum bandwidth supported by the terminal is 6 RBs and 15 RBs is used as an example as follows:

When a maximum bandwidth supported by a UE is six RBs, the terminal determines, according to the maximum bandwidth supported by the terminal, the transmission subframe location configuration of the system information, and the transmission subframe period configuration of the system information, a specific transmission subframe of the system information, where specific location configuration of the transmission subframe is as follows:

Configuration 1: a subframe 5, indicating that the system information is transmitted in a subframe 5 in a radio frame.

Configuration 2: a subframe 5 and a subframe 6, indicating that the system information is transmitted in a subframe 5 and a subframe 6 that are in a radio frame.

Configuration 3: a subframe 5, a subframe 6, a subframe 7, and a subframe 8, indicating that the system information is transmitted in a subframe 5, a subframe 6, a subframe 7, and a subframe 8 that are in a radio frame. For configuration 4, configuration 5, configuration 6, and the like, reference is made to the foregoing configuration case, and details are no longer described.

When a maximum bandwidth supported by a UE is 15 RBs, the terminal determines, according to the maximum bandwidth supported by the terminal, the transmission subframe location configuration of the system information, and the transmission subframe period configuration of the system information, a specific transmission subframe of the system information, where specific location configuration of the transmission subframe is as follows:

Configuration 1: a subframe 5, indicating that the system information is transmitted in a subframe 5 in an even-numbered or odd-numbered radio frame.

Configuration 2: a subframe 5 and a subframe 6, indicating that the system information is transmitted in a subframe 5 and a subframe 6 that are in an even-numbered or odd-numbered radio frame.

Configuration 3: a subframe 5, a subframe 6, a subframe 7, and a subframe 8, indicating that the system information is transmitted in a subframe 5, a subframe 6, a subframe 7, and a subframe 8 in an even-numbered or odd-numbered radio frame. For configuration 4, configuration 5, configuration 6, and the like, details are no longer described.

In Embodiment 7 of the present invention, on the basis of Embodiment 1, preferably, the determining, according to the scheduling information, the transmission information of the PDSCH corresponding to the system information includes: determining, according to the scheduling information and a set of modulation and coding modes of the PDSCH corresponding to the system information, a modulation and coding mode of the PDSCH corresponding to the system information, where the set of modulation and coding modes of the PDSCH corresponding to the system information is a subset of a set of modulation and coding modes of a PDSCH.

Specifically, the terminal receives the MIB or the downlink control information, and determines the scheduling information carried in the MIB or the downlink control information; the terminal may further learn the set of modulation and coding modes of the PDSCH corresponding to the system information, where the set of modulation and coding modes of the PDSCH corresponding to the system information is a subset of a set of modulation and coding modes of a PDSCH (a general set of modulation and coding modes of a PDSCH includes multiple modulation and coding modes). Then, the terminal determines, according to the scheduling information and the set of modulation and coding modes of the PDSCH corresponding to the system information, the modulation and coding mode of the PDSCH corresponding to the system information, so as to implement modulation and coding processing for the system information.

In Embodiment 8 of the present invention, on the basis of Embodiment 1, preferably, the determining, according to the scheduling information, the transmission information of the PDSCH corresponding to the system information includes: determining, according to the scheduling information, whether the first SIB exists.

Specifically, the terminal determines, according to the scheduling information in the MIB, whether the first SIB exists, where the first SIB may be a SIB in an earlier version of LTE, for example, various SIBs defined by Rel-8 and a later version, or may be a new SIB defined for coverage enhancement or machine type communication. The MIB may implicitly or explicitly indicate whether the first SIB exists, and the MIB explicitly indicating whether the first SIB exists is specifically that: in the MIB, 0 may be used to indicate that configuration of the first SIB does not exist, and 1 may be used to indicate that the configuration of the first SIB exists; or 1 may be used to indicate that configuration of the first SIB does not exist, and 0 may be used to indicate that the configuration of the first SIB exists. The MIB implicitly indicating whether the first SIB exists is specifically implicitly indicating whether an M-SIB exists, for example, multiple 0s indicate that M-SIB information does not exist, and a value of other configuration indicates that the M-SIB information is included; and the value of other configuration additionally indicates information such as a transmission subframe of the first SIB, resource allocation, or modulation of the first SIB and coding of the first SIB, and for details, reference is made to the foregoing embodiment.

According to the method provided in the foregoing embodiment, an extra overhead of a control instruction when a PDCCH is used to schedule system information in the prior art is effectively reduced, meanwhile, by using a MIB to transmit scheduling information, robustness of transmitting the scheduling information is improved, and by using downlink control information in an EPDCCH to schedule the system information, transmission of the scheduling information can support a smaller bandwidth.

Figure 2:
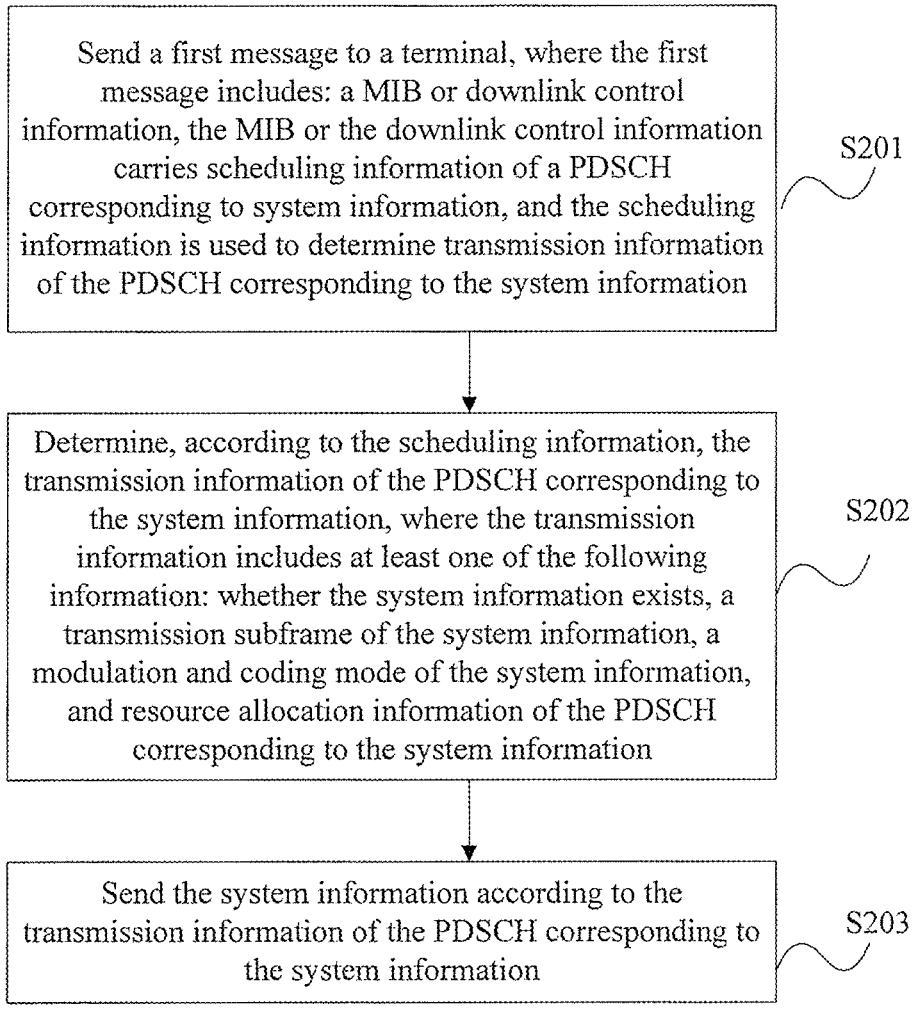
FIG. 2 is a schematic flowchart of Embodiment 9 of a system information scheduling method according to the present invention.

FIG. 2 is a schematic flowchart of Embodiment 9 of a system information scheduling method according to the present invention. The method in this embodiment is executed by a base station. The method in this embodiment includes the following steps:

S201: Send a first message to a terminal, where the first message includes: a MIB or downlink control information, the MIB or the downlink control information carries scheduling information of a PDSCH corresponding to system information, and the scheduling information is used to determine transmission information of the PDSCH corresponding to the system information.

Specifically, the base station sends the first message to the terminal, where the first message includes the MIB or the downlink control information, the MIB is used to transmit the system information, the downlink control information may be borne on a PDCCH, or may be borne on an EPDCCH, that is, either the PDCCH or the EPDCCH may bear the downlink control information to instruct a corresponding PDSCH to transmit the system information.

S202: Determine, according to the scheduling information, the transmission information of the PDSCH corresponding to the system information, where the transmission information includes at least one of the following information: whether the system information exists, a transmission subframe of the system information, a modulation and coding mode of the system information, and resource allocation information of the PDSCH corresponding to the system information.

S203: Send the system information according to the transmission information of the PDSCH corresponding to the system information.

Specifically, the base station determines, according to the scheduling information, the transmission information of the PDSCH corresponding to the system information, where the transmission information may be at least one of the following information: whether the system information exists, the transmission subframe of the system information, the modulation and coding mode of the PDSCH corresponding to the system information, and the resource allocation information of the PDSCH corresponding to the system information. The system information carries public information of a local cell or multiple cells.

After the base station determines, according to the scheduling information, the transmission information of the PDSCH corresponding to the system information, the base station sends the system information according to the transmission information of the PDSCH corresponding to the system information.

In the method provided in this embodiment, a base station determines, according to scheduling information in a MIB or downlink control information, transmission information of a PDSCH corresponding to system information, and further transmits the system information. In this way, an extra overhead of a control instruction when a PDCCH is used to schedule system information in the prior art is reduced, and meanwhile, by using a MIB to transmit scheduling information, robustness of transmitting the scheduling information is improved.

In Embodiment 10 of the present invention, on the basis of Embodiment 9, preferably, the determining, according to the scheduling information, the transmission information of the PDSCH corresponding to the system information includes: determining, according to the scheduling information and a maximum bandwidth that is supported by the terminal, the resource allocation information of the PDSCH corresponding to the system information.

Specifically, the terminal reports, to the base station, the maximum bandwidth supported by the terminal; or the terminal may configure, by predefining in a protocol, the maximum bandwidth supported by the terminal; or the terminal may receive the maximum bandwidth that is supported by the terminal and is configured by the base station. The base station determines, according to the scheduling information and the maximum bandwidth that can be supported by the terminal, the resource allocation information of the PDSCH corresponding to the system information, that is, determines the system information is specifically transmitted on which resources of the corresponding PDSCH.

In Embodiment 11 of the present invention, on the basis of Embodiment 10, preferably, the determining, according to the scheduling information and a maximum bandwidth that is supported by the terminal, the resource allocation information of the PDSCH corresponding to the system information includes: determining a resource allocation unit according to the maximum bandwidth supported by the terminal, where the resource allocation unit is used to determine a quantity of resource block groups RBGs, and determining, according to the scheduling information and the resource allocation unit, the resource allocation information of the PDSCH corresponding to the system information.

Specifically, the base station determines the resource allocation unit according to the maximum bandwidth supported by the terminal, where the resource allocation unit may be less than or equal to the maximum bandwidth supported by the terminal. It should be noted that, in the prior art, a PDCCH is used to schedule a PDSCH, and transmission of scheduling information needs to occupy an total system bandwidth; herein, using a MIB or downlink scheduling information borne on an EPDCCH to schedule a PDSCH needs to occupy only six RBs or less than six RBs, which may be specifically configured; therefore, by using the MIB or the downlink control information borne on the EPDCCH to schedule the PDSCH, transmission of scheduling information may also support a small bandwidth. Generally, a bandwidth less than 20 MHz may be referred to as a small bandwidth, for example, the small bandwidth may be 1.4 MHz, 3 MHz, 5 MHz, or the like. Specifically, that the resource allocation unit is six RBs is used as an example. A value of the resource allocation unit may be any RB ranging from one RB to six RBs. Herein, that the resource allocation unit is six RBs is used as an example as follows:

When the base station learns that the maximum bandwidth supported by the terminal is six RBs, the base station divides a system bandwidth into RBGs according to the resource allocation unit, that is, six RBs, and numbers the RBGs. That the system bandwidth is 50 RBs is used as an example, 50/6 is rounded down to eight RBGs, the eight RBGs are numbered, that is, three bits in the MIB are used to indicate a specific RBG, on which the system information is transmitted, among the eight RBGs on the PDSCH, and then, the transmission information of the PDSCH corresponding to the system information is determined.

When the base station learns that the maximum bandwidth supported by the terminal is 15 RBs, likewise, the base station divides a system bandwidth into RBGs according to the resource allocation unit, that is, six RBs, and numbers the RBGs. That the system bandwidth is 50 RBs is used as an example, 50/6 is rounded down to eight RBGs, the eight RBGs are numbered, that is, four or five bits in the MIB are used to indicate a specific RBG, on which the system information is transmitted, among the eight RBGs on the PDSCH, and then, the transmission information of the PDSCH corresponding to the system information is determined.

The foregoing manner for determining the transmission information of the PDSCH corresponding to the system information may also be a manner for allocating a resource by using a DVRB, and a quantity of required bits is, $\lceil \log_2(\lfloor N_{VRBgap1}^{DL}/N_{RB}^{step} \rfloor \cdot (\lfloor N_{VRBgap1}^{DL}/N_{RB}^{step} \rfloor +1)/2) \rceil$, where $N_{VRB,gap1}^{DL}$ is a preset value corresponding to one system bandwidth in a protocol, and reference is made to 3GPP TS 36.211; $N_{RB}^{step}$ is 6, that is, that the resource allocation information is six RBs is used as an example, and a quantity of bits obtained by means of calculation based on the foregoing formula is a resource required for transmitting the system information.

In the methods provided in Embodiment 10 and Embodiment 11, a base station determines, according to scheduling information in a MIB or downlink control information, and a maximum bandwidth supported by a terminal, specific resource allocation information of a PDSCH corresponding to system information, and further transmits the system information. In this way, an extra overhead of a control instruction when a PDCCH is used to schedule system information in the prior art is reduced, meanwhile, by using a MIB to transmit scheduling information, robustness of transmitting the scheduling information is improved, and by using downlink control information in an EPDCCH to schedule the system information, transmission of the scheduling information can support a smaller bandwidth.

In Embodiment 12 of the present invention, on the basis of Embodiment 10, preferably, the determining, according to the scheduling information and a maximum bandwidth that is supported by the terminal, the resource allocation information of the PDSCH corresponding to the system information includes: determining, according to the scheduling information, the maximum bandwidth supported by the terminal, and a cell identifier, the resource allocation information of the PDSCH corresponding to the system information.

Specifically, there may be two implementation manners, which are as follows:

A first implementation manner: The base station determines, according to the cell identifier, the maximum bandwidth supported by the terminal, and the scheduling information in the MIB, the resource allocation information of the PDSCH corresponding to the system information, where the cell identifier may be a physical cell identifier, or may be a virtual cell identifier. Further, the base station determines a quantity of RBGs according to the maximum bandwidth supported by the terminal and the scheduling information carried in the MIB. For a specific process of determining the quantity of RBGs, reference is made to Embodiment 11. Then, it is assumed that the quantity of RBGs in this embodiment is the same as that obtained by means of calculation in Embodiment 11, that is, eight RBGs, an odd-numbered cell identifier is used to indicate an RBG 0 to an RBG 3, and an even-numbered cell identifier is used to indicate an RBG 4 to an RBG 7. Herein, two bits in the MIB may be used to indicate a specific RBG, on which the system information is transmitted, among the four RBGs.

A second implementation manner: The base station determines, according to the cell identifier, the maximum bandwidth supported by the terminal, and the scheduling information in the downlink control information, the resource allocation information of the PDSCH corresponding to the system information, where the cell identifier may be a physical cell identifier, or may be a virtual cell identifier. Further, the base station determines a quantity of RBGs according to the maximum bandwidth supported by the terminal and the scheduling information carried in the downlink control information. For a specific process of determining the quantity of RBGs, reference is made to Embodiment 11. Then, it is assumed that the quantity of RBGs in this embodiment is the same as that obtained by means of calculation in Embodiment 11, that is, eight RBGs, an odd-numbered cell identifier is used to indicate an RBG 0 to an RBG 3, and an even-numbered cell identifier is used to indicate an RBG 4 to an RBG 7. Herein, two bits in the downlink control information may be used to indicate a specific RBG, on which the system information is transmitted, among the four RBGs.

Specifically, the foregoing RBG may be a physical resource block group, or may be a virtual resource block group. A specific physical resource block group is determined from the virtual resource block group according to a system frame number, a radio frame number, a subframe number, or a timeslot number; that is, one virtual resource block group corresponds to different physical resource block groups in different system frames, radio frames, subframes, or timeslots, for example, a virtual resource block group 0 indicates a physical resource block group 0 in a system frame with an even-numbered system frame number, and indicates a physical resource block group 3 in a system frame with an odd-numbered frame number.

In the method provided in this embodiment, a base station determines, according to scheduling information in a MIB or downlink control information, a maximum bandwidth supported by a terminal, and a cell identifier, resource allocation information of a PDSCH corresponding to system information, and further transmits the system information. In this way, an extra overhead of a control instruction when a PDCCH is used to schedule system information in the prior art is reduced, meanwhile, by using a MIB to transmit scheduling information, robustness of transmitting the scheduling information is improved, and by using downlink control information in an EPDCCH to schedule the system information, transmission of the scheduling information can support a smaller bandwidth.

In Embodiment 13 of the present invention, on the basis of Embodiment 9, preferably, the sending the MIB or the downlink control information to the terminal includes: determining, according to the maximum bandwidth supported by the terminal, an aggregation level of a PDCCH that bears the downlink control information or an aggregation level of an EPDCCH that bears the downlink control information, determining, according to the determined aggregation level, at least one PDCCH candidate corresponding to the aggregation level or at least one EPDCCH candidate corresponding to the aggregation level, and sending the downlink control information on the at least one PDCCH candidate or at least one EPDCCH candidate, where the aggregation level includes the maximum bandwidth supported by the terminal or an integral multiple of the maximum bandwidth supported by the terminal.

Specifically, the terminal reports, to the base station, the maximum bandwidth supported by the terminal; and the base station receives the maximum bandwidth that is supported by the terminal and is reported by the terminal, and determines, according to the bandwidth, the aggregation level of the PDCCH that bears the downlink control information or the aggregation level of the EPDCCH that bears the downlink control information. An aggregation level of an EPDCCH of a SIB that schedules an MTC is different from an aggregation level of an EPDCCH of a SIB that schedules a non-MTC. The EPDCCH of the SIB that schedules the MTC supports transmission of an EPDCCH whose aggregation level is 6, 12, or 24, that is, the aggregation level of the EPDCCH of the SIB that schedules the MTC includes the maximum bandwidth supported by the terminal or an integral multiple of the maximum bandwidth supported by the terminal, and is higher than an aggregation level used by a SIB that schedules an MTC in the prior art, that is, one EPDCCH occupies 12 or 24 enhanced control channel units. After determining the aggregation level of the EPDCCH according to the maximum bandwidth supported by the terminal, the base station determines a PDCCH candidate or an EPDCCH candidate corresponding to the aggregation level, and sends the downlink control information on the at least one PDCCH candidate or EPDCCH candidate. Likewise, the terminal determines, according to the maximum bandwidth supported by the terminal, the aggregation level of the PDCCH that bears the downlink control information or the aggregation level of the EPDCCH that bears the downlink control information, monitors the PDCCH candidate or the EPDCCH candidate at the determined aggregation level, receives the downlink control information in an effective PDCCH or EPDCCH, and further acquires the scheduling information in the downlink control information; for subsequent processing, reference is made to the foregoing embodiments.

In the method provided in this embodiment, a base station determines, according to a maximum bandwidth supported by a terminal, an aggregation level of an EPDCCH that bears downlink control information, and because an aggregation level of an EPDCCH of a SIB that schedules an MTC is higher than an aggregation level in the prior art, robustness of transmitting the SIB is higher.

In Embodiment 14 of the present invention, on the basis of Embodiment 9, preferably, the determining, according to the scheduling information, the transmission information of the PDSCH corresponding to the system information includes: determining, according to the scheduling information, transmission subframe location configuration of the system information and transmission subframe period configuration of the system information, where the transmission subframe location configuration of the system information is used to indicate a radio frame and a subframe location for transmitting the system information, and the transmission subframe period configuration of the system information is used to indicate a transmission subframe period of the system information; and determining the transmission subframe of the system information according to the transmission subframe location configuration of the system information and the transmission subframe period configuration of the system information.

Specifically, the base station determines, according to the determined scheduling information, the transmission subframe location configuration of the system information and the transmission subframe period configuration of the system information, which is specifically as follows: the transmission subframe period of the system information may be 40 ms, or may be a multiple of 40 ms; for a specific radio frame and a specific subframe location for transmitting the system information, the following cases are predefined according to a protocol: the subframe location that is for transmitting the system information and is determined by using the scheduling information in the MIB or the downlink control information may be a subframe 5 in an even-numbered radio frame, may be a subframe 5 and a subframe 6 that are in an even-numbered radio frame, or may be a subframe 5, a subframe 6, a subframe 7, and a subframe 8 that are in an even-numbered radio frame, that is, the system information is specifically transmitted in a corresponding subframe of the radio frame.

Further, on the basis of Embodiment 14, more preferably, the determining the transmission subframe of the system information according to the transmission subframe location configuration of the system information and the transmission subframe period configuration of the system information includes: determining the transmission subframe of the system information according to a maximum bandwidth supported by the terminal, the transmission subframe location configuration of the system information, and the transmission subframe period configuration of the system information.

Similarly, that the maximum bandwidth supported by the terminal is six RBs and 15 RBs is used as an example as follows:

When a maximum bandwidth supported by a UE is six RBs, the base station determines, according to the maximum bandwidth supported by the terminal, the transmission subframe location configuration of the system information, and the transmission subframe period configuration of the system information, a specific transmission subframe of the system information, where specific location configuration of the transmission subframe is as follows:

Configuration 1: a subframe 5, indicating that the system information is transmitted in a subframe 5 in a radio frame.

Configuration 2: a subframe 5 and a subframe 6, indicating that the system information is transmitted in a subframe 5 and a subframe 6 that are in a radio frame.

Configuration 3: a subframe 5, a subframe 6, a subframe 7, and a subframe 8, indicating that the system information is transmitted in a subframe 5, a subframe 6, a subframe 7, and a subframe 8 that are in a radio frame. For configuration 4, configuration 5, configuration 6, and the like, reference is made to the foregoing configuration case, and details are no longer described.

When a maximum bandwidth supported by a UE is 15 RBs, the base station determines, according to the maximum bandwidth supported by the terminal, the transmission subframe location configuration of the system information, and the transmission subframe period configuration of the system information, a specific transmission subframe of the system information, where specific location configuration of the transmission subframe is as follows:

Configuration 1: a subframe 5, indicating that the system information is transmitted in a subframe 5 in an even-numbered or odd-numbered radio frame.

Configuration 2: a subframe 5 and a subframe 6, indicating that the system information is transmitted in a subframe 5 and a subframe 6 that are in an even-numbered or odd-numbered radio frame.

Configuration 3: a subframe 5, a subframe 6, a subframe 7, and a subframe 8, indicating that the system information is transmitted in a subframe 5, a subframe 6, a subframe 7, and a subframe 8 in an even-numbered or odd-numbered radio frame; and for configuration 4, configuration 5, configuration 6, and the like, details are no longer described.

In Embodiment 15 of the present invention, on the basis of Embodiment 9, preferably, the determining, according to the scheduling information, the transmission information of the PDSCH corresponding to the system information includes: determining, according to the scheduling information and a set of modulation and coding modes of the PDSCH corresponding to the system information, a modulation and coding mode of the PDSCH corresponding to the system information, where the set of modulation and coding modes of the PDSCH corresponding to the system information is a subset of a set of modulation and coding modes of a PDSCH.

Specifically, the base station learns the set of modulation and coding modes of the PDSCH corresponding to the system information, the maximum bandwidth supported by the terminal, and the scheduling information, where the set of modulation and coding modes of the PDSCH corresponding to the system information is a subset of a set of modulation and coding modes of a PDSCH (a general set of modulation and coding modes of a PDSCH includes multiple modulation and coding modes). The base station determines, according to the foregoing scheduling information and the predefined set of modulation and coding modes of the PDSCH corresponding to the system information, the modulation and coding mode of the PDSCH corresponding to the system information, so as to implement modulation and coding processing for the system information.

In Embodiment 16 of the present invention, on the basis of Embodiment 9, preferably, the determining, according to the scheduling information, the transmission information of the PDSCH corresponding to the system information includes: determining, according to the scheduling information, whether the first SIB exists.

Specifically, the base station determines, according to the scheduling information in the MIB, whether the first SIB exists. The MIB may implicitly or explicitly indicate whether the first SIB exists, and the MIB explicitly indicating whether the first SIB exists is specifically that: in the MIB, 0 may be used to indicate that configuration of the first SIB does not exist, and 1 may be used to indicate that the configuration of the first SIB exists; or 1 may be used to indicate that configuration of the first SIB does not exist, and 0 may be used to indicate that the configuration of the first SIB exists. The MIB implicitly indicating whether the first SIB exists is specifically implicitly indicating whether an M-SIB exists, for example, multiple 0s indicate that M-SIB information does not exist, and a value of other configuration indicates that the M-SIB information is included; and the value of other configuration additionally indicates information such as a transmission subframe of the first SIB, resource allocation, or modulation and coding, and for details, reference is made to the foregoing embodiment.

According to the method provided in the foregoing embodiment, an extra overhead of a control instruction when a PDCCH is used to schedule system information in the prior art is effectively reduced, meanwhile, by using a MIB to transmit scheduling information, robustness of transmitting the scheduling information is improved, and by using downlink control information in an EPDCCH to schedule the system information, transmission of the scheduling information can support a smaller bandwidth.

Persons of ordinary skill in the art may understand that all or a part of the steps of the foregoing method embodiments may be implemented by a program instructing relevant hardware. The foregoing program may be stored in a computer readable storage medium. When the foregoing program runs, the steps of the foregoing method embodiments are performed. The foregoing storage medium includes any medium that can store program code, such as a ROM, a RAM, a magnetic disk, or an optical disc.

Figure 3:
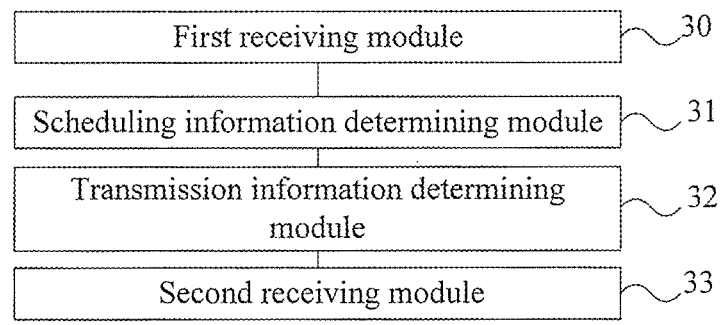
FIG. 3 is a schematic structural diagram of a system information scheduling apparatus according to Embodiment 1 of the present invention.

FIG. 3 is a schematic structural diagram of Embodiment 1 of a system information scheduling apparatus according to the present invention. As shown in FIG. 3, the system information scheduling apparatus may be integrated into a terminal. The apparatus includes: a first receiving module 30, configured to receive a first message sent by a base station, where the first message includes a MIB or downlink control information; a scheduling information determining module 31, configured to determine, according to the first message, scheduling information of a PDSCH corresponding to the first message, where the scheduling information includes scheduling information of a PDSCH corresponding to system information in the MIB, or includes scheduling information of a PDSCH corresponding to system information in the downlink control information; and the scheduling information is used to determine transmission information of the PDSCH corresponding to the system information; a transmission information determining module 32, configured to determine, according to the scheduling information, the transmission information of the PDSCH corresponding to the system information, where the transmission information includes at least one of the following information: whether the system information exists, information about a transmission subframe of the system information, a modulation and coding mode of the system information, and resource allocation information of the PDSCH corresponding to the system information; and a second receiving module 33, configured to receive the system information on the PDSCH according to the scheduling information.

The system information scheduling apparatus in this embodiment may perform Embodiment 1 of the foregoing system information scheduling method, and implementation principles and technical effects thereof are similar and details are not described herein again.

Figure 4:
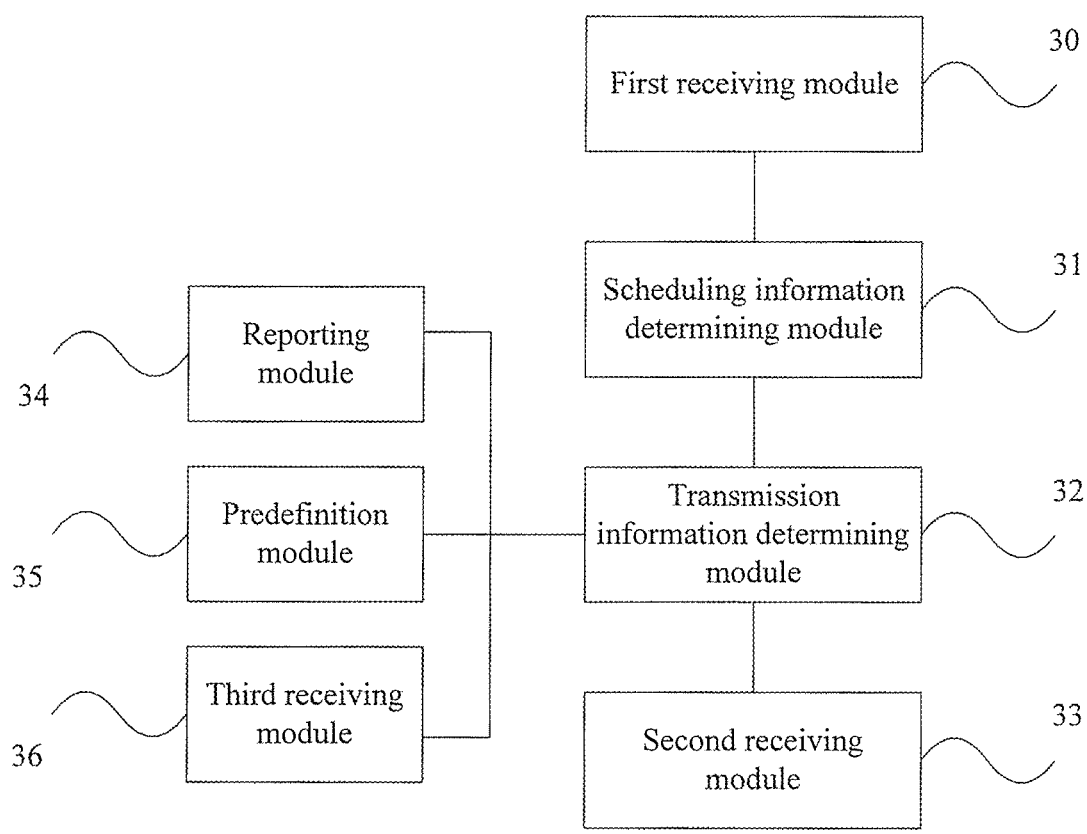
FIG. 4 is a schematic structural diagram of a system information scheduling apparatus according to Embodiment 2 of the present invention.

FIG. 4 is a schematic structural diagram of Embodiment 2 of a system information scheduling apparatus according to the present invention. On the basis of the embodiment shown in FIG. 3, the apparatus may further include: a reporting module 34, configured to report, to the base station, a maximum bandwidth supported by a terminal; or a predefinition module 35, configured to configure, by predefining in a protocol, a maximum bandwidth supported by a terminal; or a third receiving module 36, configured to receive a maximum bandwidth that is supported by a terminal and is configured by the base station.

The system information scheduling apparatus in this embodiment may perform Embodiment 2 of the foregoing system information scheduling method, and implementation principles and technical effects thereof are similar and details are not described herein again.

Figure 5:
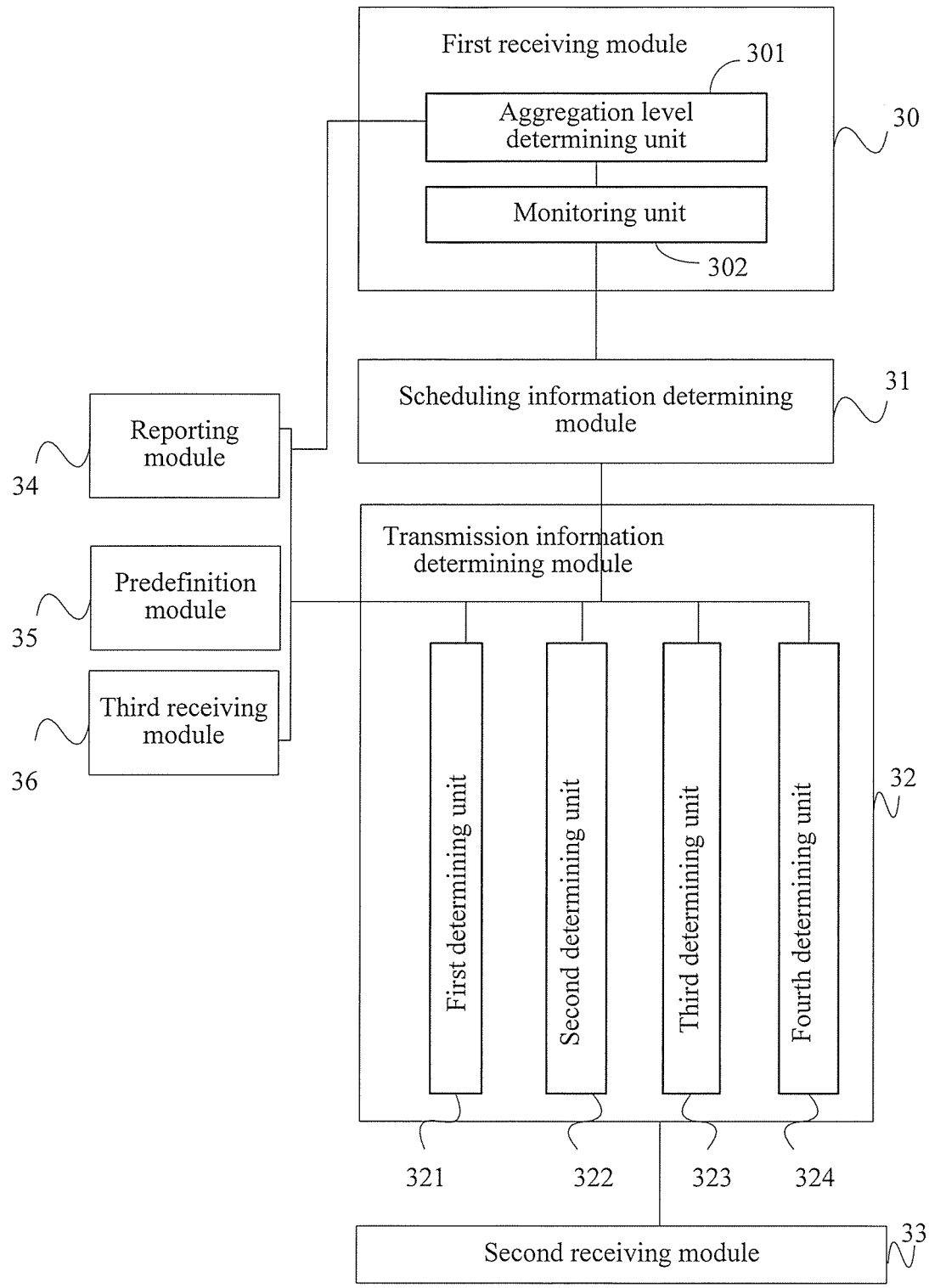
FIG. 5 is a schematic structural diagram of a system information scheduling apparatus according to Embodiment 3 of the present invention.

FIG. 5 is a schematic structural diagram of Embodiment 3 of a system information scheduling apparatus according to the present invention. On the basis of the embodiment shown in FIG. 4, the transmission information determining module 32 includes: a first determining unit 321, configured to determine, according to the scheduling information and the maximum bandwidth that is supported by the terminal, the resource allocation information of the PDSCH corresponding to the system information.

The system information scheduling apparatus in this embodiment may perform Embodiment 2 of the foregoing system information scheduling method, and implementation principles and technical effects thereof are similar and details are not described herein again.

Further, on the basis of the embodiment shown in FIG. 5, the first determining unit 321 is specifically configured to determine a resource allocation unit according to the maximum bandwidth supported by the terminal, where the resource allocation unit is used to determine a quantity of resource block groups RBGs; and determine, according to the scheduling information and the resource allocation unit, the resource allocation information of the PDSCH corresponding to the system information.

The system information scheduling apparatus in this embodiment may perform Embodiment 3 of the foregoing system information scheduling method, and implementation principles and technical effects of thereof are similar and details are not described herein again.

Further, on the basis of the embodiment shown in FIG. 5, the first determining unit 321 is specifically configured to determine, according to the scheduling information, the maximum bandwidth supported by the terminal, and a cell identifier, the resource allocation information of the PDSCH corresponding to the system information.

The system information scheduling apparatus in this embodiment may perform Embodiment 4 of the foregoing system information scheduling method, and implementation principles and technical effects thereof are similar and details are not described herein again.

Still further, on the basis of the embodiment shown in FIG. 5, the first receiving module 30 includes: an aggregation level determining unit 301, configured to determine, according to the maximum bandwidth supported by the terminal, an aggregation level of a PDCCH that bears the downlink control information or an aggregation level of an EPDCCH that bears the downlink control information; and a monitoring unit 302, configured to monitor the PDCCH candidate or the EPDCCH candidate at the determined aggregation level, and receive the downlink control information on the PDCCH or the downlink control information on the EPDCCH.

The system information scheduling apparatus in this embodiment may perform Embodiment 5 of the foregoing system information scheduling method, and implementation principles and technical effects thereof are similar and details are not described herein again.

Still further, on the basis of the embodiment shown in FIG. 5, the transmission information determining module 32 may further include: a second determining unit 322, configured to determine, according to the scheduling information, transmission subframe location configuration of the system information and transmission subframe period configuration of the system information, where the transmission subframe location configuration of the system information is used to indicate a radio frame and a subframe location for transmitting the system information, and the transmission subframe period configuration of the system information is used to indicate a transmission subframe period of the system information; and determine the transmission subframe of the system information according to the transmission subframe location configuration of the system information and the transmission subframe period configuration of the system information.

The system information scheduling apparatus in this embodiment may perform Embodiment 6 of the foregoing system information scheduling method, and implementation principles and technical effects thereof are similar and details are not described herein again.

Still further, on the basis of the embodiment shown in FIG. 5, the second determining unit 322 is specifically configured to determine the transmission subframe of the system information according to a maximum bandwidth supported by the terminal, the transmission subframe location configuration of the system information, and the transmission subframe period configuration of the system information.

The system information scheduling apparatus in this embodiment may perform Embodiment 6 of the foregoing system information scheduling method, and implementation principles and technical effects thereof are similar and details are not described herein again.

Still further, on the basis of the embodiment shown in FIG. 5, the transmission information determining module 32 may further include: a third determining unit 323, configured to determine, according to the scheduling information and a set of modulation and coding modes of the PDSCH corresponding to the system information, the modulation and coding mode of the PDSCH corresponding to the system information; where the set of modulation and coding modes of the PDSCH corresponding to the system information is a subset of a set of modulation and coding modes of a PDSCH.

The system information scheduling apparatus in this embodiment may perform Embodiment 7 of the foregoing system information scheduling method, and implementation principles and technical effects thereof are similar and details are not described herein again.

Still further, on the basis of the embodiment shown in FIG. 5, the transmission information determining module 32 may further include: a fourth determining unit 324, configured to determine, according to the scheduling information, whether a first SIB exists.

The system information scheduling apparatus in this embodiment may perform Embodiment 8 of the foregoing system information scheduling method, and implementation principles and technical effects thereof are similar and details are not described herein again.

Figure 6:
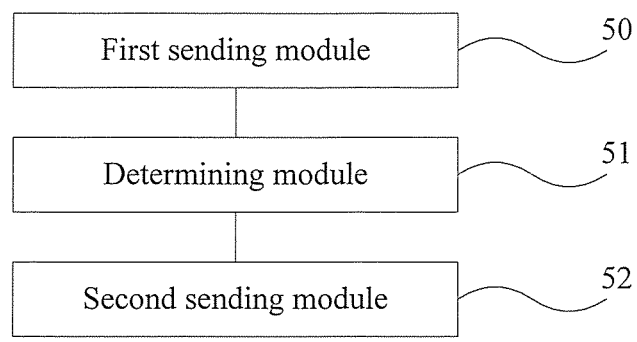
FIG. 6 is a schematic structural diagram of a system information scheduling apparatus according to Embodiment 4 of the present invention.

FIG. 6 is a schematic structural diagram of Embodiment 4 of a system information scheduling apparatus according to the present invention. As shown in FIG. 6, the system information scheduling apparatus is integrated into a base station. The apparatus includes: a first sending module 50, configured to send a first message to a terminal, where the first message includes: a MIB or downlink control information, the MIB or the downlink control information carries scheduling information of a PDSCH corresponding to system information, and the scheduling information is used to determine transmission information of the PDSCH corresponding to the system information; a determining module 51, configured to determine, according to the scheduling information, the transmission information of the PDSCH corresponding to the system information, where the transmission information includes at least one of the following information: whether the system information exists, a transmission subframe of the system information, a modulation and coding mode of the system information, and resource allocation information of the PDSCH corresponding to the system information; and a second sending module 52, configured to send the system information on the PDSCH according to the scheduling information.

The system information scheduling apparatus in this embodiment may perform Embodiment 9 of the foregoing system information scheduling method, and implementation principles and technical effects thereof are similar and details are not described herein again.

Figure 7:
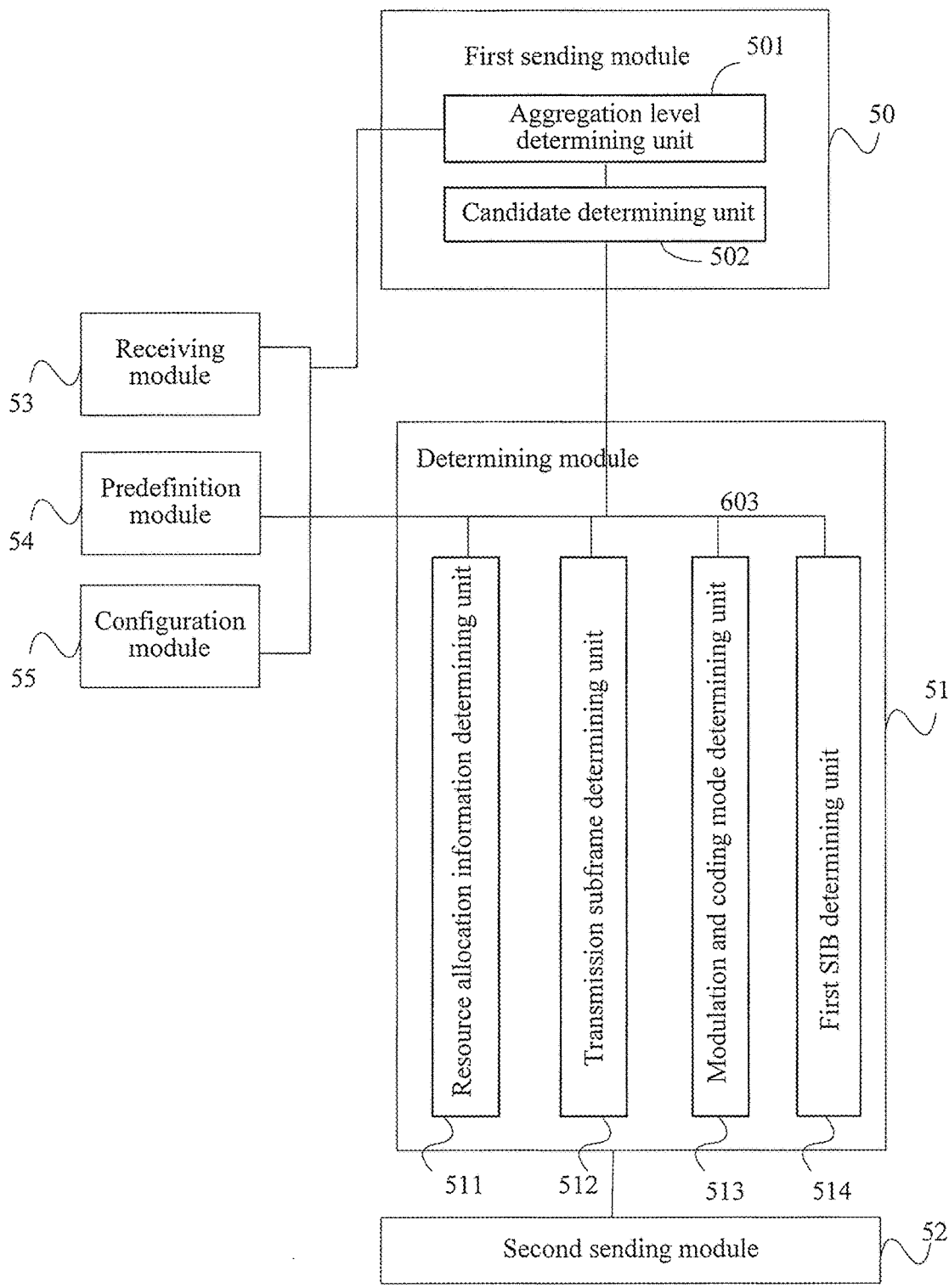
FIG. 7 is a schematic structural diagram of a system information scheduling apparatus according to of Embodiment 5 the present invention.

FIG. 7 is a schematic structural diagram of Embodiment 5 of a system information scheduling apparatus according to the present invention. On the basis of the embodiment shown in FIG. 6, the apparatus may further include: a receiving module 53, configured to receive a maximum bandwidth that is supported by the terminal and is reported by the terminal; or a predefinition module 54, configured to configure, by predefining in a protocol, a maximum bandwidth supported by the terminal; or a configuration module 55, configured to configure, for the terminal, a maximum bandwidth supported by the terminal. The system information scheduling apparatus in this embodiment may perform Embodiment 10 of the foregoing system information scheduling method, and implementation principles and technical effects thereof are similar and details are not described herein again.

Further, on the basis of the embodiment shown in FIG. 7, the determining module 51 includes: a resource allocation information determining unit 511, configured to determine, according to the scheduling information and the maximum bandwidth that is supported by the terminal, the resource allocation information of the PDSCH corresponding to the system information.

The system information scheduling apparatus in this embodiment may perform Embodiment 10 of the foregoing system information scheduling method, and implementation principles and technical effects thereof are similar and details are not described herein again.

Further, on the basis of the embodiment shown in FIG. 7, the resource allocation information determining unit 511 is specifically configured to determine a resource allocation unit according to the maximum bandwidth supported by the terminal, where the resource allocation unit is used to determine a quantity of resource block groups RBGs; and determine, according to the scheduling information and the resource allocation unit, the resource allocation information of the PDSCH corresponding to the system information.

The system information scheduling apparatus in this embodiment may perform Embodiment 11 of the foregoing system information scheduling method, and implementation principles and technical effects thereof are similar and details are not described herein again.

Further, on the basis of the embodiment shown in FIG. 7, the resource allocation information determining unit 511 is specifically configured to determine, according to the scheduling information, the maximum bandwidth supported by the terminal, and a cell identifier, the resource allocation information of the PDSCH corresponding to the system information.

The system information scheduling apparatus in this embodiment may perform Embodiment 12 of the foregoing system information scheduling method, and implementation principles and technical effects thereof are similar and details are not described herein again.

Still further, on the basis of the embodiment shown in FIG. 7, the first sending module 50 includes: an aggregation level determining unit 501, configured to determine, according to the maximum bandwidth supported by the terminal, an aggregation level of a PDCCH that bears the downlink control information or an aggregation level of an EPDCCH that bears the downlink control information; and a candidate determining unit 502, configured to determine, according to the determined aggregation level, at least one PDCCH candidate corresponding to the aggregation level or at least one EPDCCH candidate corresponding to the aggregation level, and send the downlink control information on the at least one PDCCH candidate or the at least one EPDCCH candidate.

The system information scheduling apparatus in this embodiment may perform Embodiment 13 of the foregoing system information scheduling method, and implementation principles and technical effects thereof are similar and details are not described herein again.

Still further, on the basis of the embodiment shown in FIG. 7, the determining module 51 may further include: a transmission subframe determining unit 512, configured to determine, according to the scheduling information, transmission subframe location configuration of the system information and transmission subframe period configuration of the system information, where the transmission subframe location configuration of the system information is used to indicate a radio frame and a subframe location for transmitting the system information, and the transmission subframe period configuration of the system information is used to indicate a transmission subframe period of the system information; and determine the transmission subframe of the system information according to the transmission subframe location configuration of the system information and the transmission subframe period configuration of the system information.

The system information scheduling apparatus in this embodiment may perform Embodiment 14 of the foregoing system information scheduling method, and implementation principles and technical effects thereof are similar and details are not described herein again.

Still further, on the basis of the embodiment shown in FIG. 7, the transmission subframe determining unit 512 is specifically configured to determine the transmission subframe of the system information according to a maximum bandwidth supported by the terminal, the transmission subframe location configuration of the system information, and the transmission subframe period configuration of the system information.

The system information scheduling apparatus in this embodiment may perform Embodiment 14 of the foregoing system information scheduling method, and implementation principles and technical effects thereof are similar and details are not described herein again.

Still further, on the basis of the embodiment shown in FIG. 7, the determining module 51 may further include: a modulation and coding mode determining unit 513, configured to determine, according to the scheduling information and a set of modulation and coding modes of the PDSCH corresponding to the system information, the modulation and coding mode of the PDSCH corresponding to the system information, where the set of modulation and coding modes of the PDSCH corresponding to the system information is a subset of a set of modulation and coding modes of a PDSCH.

The system information scheduling apparatus in this embodiment may perform Embodiment 15 of the foregoing system information scheduling method, and implementation principles and technical effects thereof are similar and details are not described herein again.

Still further, on the basis of the embodiment shown in FIG. 7, the determining module 51 may further include: a first SIB determining unit 514, configured to determine, according to the scheduling information, whether a first SIB exists.

The system information scheduling apparatus in this embodiment may perform Embodiment 16 of the foregoing system information scheduling method, and implementation principles and technical effects thereof are similar and details are not described herein again.

Figure 8:
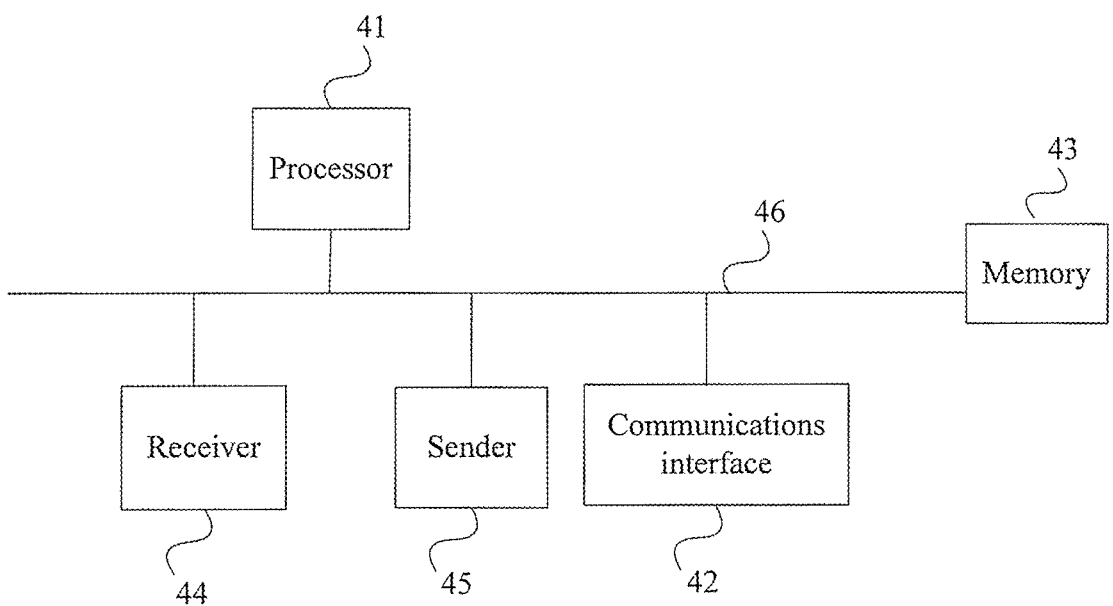
FIG. 8 is a schematic structural diagram of a terminal according to an embodiment of the present invention.

FIG. 8 is a schematic structural diagram of an embodiment of a terminal according to the present invention. Specific implementation of a base station is not limited in a specific embodiment of the present invention. As shown in FIG. 8, the terminal includes a processor (processor) 41, a communications interface (Communications Interface) 42, a memory (memory) 43, a receiver 44, a sender 45, and a bus 46.

The processor 41, the communications interface 42, the memory 43, the receiver 44, and the sender 45 implement communication with each other through the bus 46; the communications interface 42 is configured to perform communication with another device; and the processor 41 is configured to execute a program A.

Specifically, the program A may include program code, where the program code includes a computer operation instruction.

The processor 41 may be a central processing unit CPU, or an application specific integrated circuit ASIC (Application Specific Integrated Circuit), or one or more integrated circuits configured to implement this embodiment of the present invention.

The memory 43 is configured to store the program A. The memory 43 may include a high-speed RAM memory, or may include a non-volatile memory (non-volatile memory), for example, at least one disk memory. The program A may specifically include:

receiving a first message sent by a base station, where the first message includes a MIB or downlink control information;

determining, according to the first message, scheduling information of a physical downlink shared channel PDSCH corresponding to the first message, where the scheduling information includes scheduling information of a PDSCH corresponding to system information in the MIB, or includes scheduling information of a PDSCH corresponding to system information in the downlink control information; and the scheduling information is used to determine transmission information of the PDSCH corresponding to the system information;

determining, according to the scheduling information, the transmission information of the PDSCH corresponding to the system information, where the transmission information includes at least one of the following information: whether the system information exists, a transmission subframe of the system information, a modulation and coding mode of the PDSCH corresponding to the system information, and resource allocation information of the PDSCH corresponding to the system information; and receiving the system information according to the transmission information of the PDSCH corresponding to the system information.

According to the foregoing program A, preferably, a maximum bandwidth supported by the terminal is reported to the base station; or a maximum bandwidth supported by the terminal is configured by predefining in a protocol; or a maximum bandwidth that is supported by the terminal and is configured by the base station is received.

According to the foregoing program A, preferably, the system information includes a first system information block SIB.

According to the foregoing program A, preferably, the determining, according to the scheduling information, the transmission information of the PDSCH corresponding to the system information includes: determining, according to the scheduling information and the maximum bandwidth that is supported by the terminal, the resource allocation information of the PDSCH corresponding to the system information.

According to the foregoing program A, preferably, the determining, according to the scheduling information and the maximum bandwidth that is supported by the terminal, the resource allocation information of the PDSCH corresponding to the system information includes: determining a resource allocation unit according to the maximum bandwidth supported by the terminal, where the resource allocation unit is used to determine a quantity of resource block groups RBGs, and determining, according to the scheduling information and the resource allocation unit, the resource allocation information of the PDSCH corresponding to the system information.

According to the foregoing program A, preferably, the determining, according to the scheduling information and the maximum bandwidth that is supported by the terminal, the resource allocation information of the PDSCH corresponding to the system information includes: determining, according to the scheduling information, the maximum bandwidth supported by the terminal, and a cell identifier, the resource allocation information of the PDSCH corresponding to the system information.

According to the foregoing program A, preferably, the receiving the MIB or the downlink control information sent by the base station includes: determining, according to the maximum bandwidth supported by the terminal, an aggregation level of a PDCCH that bears the downlink control information or an aggregation level of an EPDCCH that bears the downlink control information; and monitoring the PDCCH candidate or an EPDCCH candidate at the determined aggregation level, and receiving the downlink control information on the PDCCH or the downlink control information on the EPDCCH.

According to the foregoing program A, preferably, the aggregation level includes the maximum bandwidth supported by the terminal or an integral multiple of the maximum bandwidth supported by the terminal.

According to the foregoing program A, preferably, the determining, according to the scheduling information, the transmission information of the PDSCH corresponding to the system information includes: determining, according to the scheduling information, transmission subframe location configuration of the system information and transmission subframe period configuration of the system information, where the transmission subframe location configuration of the system information is used to indicate a radio frame and a subframe location for transmitting the system information, and the transmission subframe period configuration of the system information is used to indicate a transmission subframe period of the system information; and determining the transmission subframe of the system information according to the transmission subframe location configuration of the system information and the transmission subframe period configuration of the system information.

According to the foregoing program A, preferably, the determining the transmission subframe of the system information according to the transmission subframe location configuration of the system information and the transmission subframe period configuration of the system information includes: determining the transmission subframe of the system information according to a maximum bandwidth supported by the terminal, the transmission subframe location configuration of the system information, and the transmission subframe period configuration of the system information.

According to the foregoing program A, preferably, the determining, according to the scheduling information, the transmission information of the PDSCH corresponding to the system information includes: determining, according to the scheduling information and a set of modulation and coding modes of the PDSCH corresponding to the system information, the modulation and coding mode of the PDSCH corresponding to the system information, where the set of modulation and coding modes of the PDSCH corresponding to the system information is a subset of a set of modulation and coding modes of a PDSCH.

According to the foregoing program A, preferably, the transmission subframe location configuration of the system information includes: a subframe 5 in an even-numbered radio frame; or a subframe 5 and a subframe 6 that are in an even-numbered radio frame; or a subframe 5, a subframe 6, a subframe 7, and a subframe 8 that are in an even-numbered radio frame.

According to the foregoing program A, preferably, the determining, according to the scheduling information, the transmission information of the PDSCH corresponding to the system information includes: determining, according to the scheduling information, whether the first SIB exists.

In an embodiment of a base station provided in the present invention, specific implementation of a terminal is not limited in a specific embodiment of the present invention. Referring to FIG. 8, a structure of the base station is similar to that of the terminal, and the base station includes a processor, a communications interface, a receiver, a sender, and a bus.

The processor, the communications interface, a memory, the receiver, and the sender implement communication with each other through the bus; the communications interface is configured to perform communication with another device; and the processor is configured to execute a program B.

Specifically, the program B may include program code, where the program code includes a computer operation instruction.

The processor may be a central processing unit CPU, or an application specific integrated circuit ASIC, or one or more integrated circuits configured to implement this embodiment of the present invention.

The memory is configured to store the program B. The memory may include a high-speed RAM memory, or may include a non-volatile memory (non-volatile memory), for example, at least one disk memory. The program B may specifically include:

sending a first message to a terminal, where the first message includes: a MIB or downlink control information, the MIB or the downlink control information carries scheduling information of a PDSCH corresponding to system information, and the scheduling information is used to determine transmission information of the PDSCH corresponding to the system information.

determining, according to the scheduling information, the transmission information of the PDSCH corresponding to the system information, where the transmission information includes at least one of the following information: whether the system information exists, a transmission subframe of the system information, a modulation and coding mode of the system information, and resource allocation information of the PDSCH corresponding to the system information; and sending the system information according to the transmission information of the PDSCH corresponding to the system information.

According to the foregoing program B, preferably, a maximum bandwidth that is supported by the terminal and is reported by the terminal is received; or a maximum bandwidth supported by the terminal is configured by predefining in a protocol; or a maximum bandwidth supported by the terminal is configured for the terminal.

According to the foregoing program B, preferably, the system information includes a first system information block SIB.

According to the foregoing program B, preferably, the determining, according to the scheduling information, the transmission information of the PDSCH corresponding to the system information includes: determining, according to the scheduling information and the maximum bandwidth that is supported by the terminal, the resource allocation information of the PDSCH corresponding to the system information.

According to the foregoing program B, preferably, the determining, according to the scheduling information and the maximum bandwidth that is supported by the terminal, the resource allocation information of the PDSCH corresponding to the system information includes: determining a resource allocation unit according to the maximum bandwidth supported by the terminal, where the resource allocation unit is used to determine a quantity of resource block groups RBGs, and determining, according to the scheduling information and the resource allocation unit, the resource allocation information of the PDSCH corresponding to the system information.

According to the foregoing program B, preferably, the determining, according to the scheduling information and the maximum bandwidth that is supported by the terminal, the resource allocation information of the PDSCH corresponding to the system information includes: determining, according to the scheduling information, the maximum bandwidth supported by the terminal, and a cell identifier, the resource allocation information of the PDSCH corresponding to the system information.

According to the foregoing program B, preferably, the sending the MIB or the downlink control information to the terminal includes: determining, according to the maximum bandwidth supported by the terminal, an aggregation level of a PDCCH that bears the downlink control information or an aggregation level of an EPDCCH that bears the downlink control information; and determining, according to the determined aggregation level, at least one PDCCH candidate corresponding to the aggregation level or at least one EPDCCH candidate corresponding to the aggregation level, and sending the downlink control information on the at least one PDCCH corresponding to the aggregation level or the at least one EPDCCH candidate corresponding to the aggregation level.

According to the foregoing program B, preferably, the aggregation level includes the maximum bandwidth supported by the terminal or an integral multiple of the maximum bandwidth supported by the terminal.

According to the foregoing program B, preferably, the determining, according to the scheduling information, the transmission information of the PDSCH corresponding to the system information includes: determining, according to the scheduling information, transmission subframe location configuration of the system information and transmission subframe period configuration of the system information, where the transmission subframe location configuration of the system information is used to indicate a radio frame and a subframe location for transmitting the system information, and the transmission subframe period configuration of the system information is used to indicate a transmission subframe period of the system information; and determining the transmission subframe of the system information according to the transmission subframe location configuration of the system information and the transmission subframe period configuration of the system information.

According to the foregoing program B, preferably, the determining the transmission subframe of the system information according to the transmission subframe location configuration of the system information and the transmission subframe period configuration of the system information includes: determining the transmission subframe of the system information according to a maximum bandwidth supported by the terminal, the transmission subframe location configuration of the system information, and the transmission subframe period configuration of the system information.

According to the foregoing program B, preferably, the determining, according to the scheduling information, the transmission information of the PDSCH corresponding to the system information includes: determining, according to the scheduling information and a set of modulation and coding modes of the PDSCH corresponding to the system information, the modulation and coding mode of the PDSCH corresponding to the system information, where the set of modulation and coding modes of the PDSCH corresponding to the system information is a subset of a set of modulation and coding modes of a PDSCH.

According to the foregoing program B, preferably, the transmission subframe location configuration of the system information includes: a subframe 5 in an even-numbered radio frame; or a subframe 5 and a subframe 6 that are in an even-numbered radio frame; or a subframe 5, a subframe 6, a subframe 7, and a subframe 8 that are in an even-numbered radio frame.

According to the foregoing program B, preferably, the determining, according to the scheduling information, the transmission information of the PDSCH corresponding to the system information includes: determining, according to the scheduling information, whether the first SIB exists.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof; however these modifications or replacements do not make the essence of corresponding technical solutions depart from the scope of the technical solutions in the embodiments of the present invention.

What is claimed is:

1. An information processing method for use at a terminal in communication with a base station serving the terminal, the method comprising:
- receiving scheduling information of a physical downlink shared channel (PDSCH) carrying system information, the scheduling information of the PDSCH being carried in a master information block (MIB) sent from the base station, wherein the scheduling information of the PDSCH is used for determining at least one kind of transmission information of the PDSCH as follows: the system information exists or does not exist, a subframe where the system information is transmitted, a transmission period of the subframe, a modulation and coding mode of the PDSCH, and resource allocation information of the PDSCH;
- when the transmission information of the PDSCH comprises the resource allocation information of the PDSCH, determining the resource allocation information of the PDSCH according to the scheduling information of the PDSCH;
- determining, according to the scheduling information and a set of modulation and coding modes of the PDSCH corresponding to the system information, the modulation and coding mode of the PDSCH corresponding to the system information, for implementing modulation and coding processing for the system information; and
- wherein determining the resource allocation information of the PDSCH comprises:
  - determining, according to the scheduling information, a maximum bandwidth supported by the terminal, and a cell identifier.

2. The method according to claim 1, wherein the system information is comprised in a system information block (SIB) carried on the PDSCH.

3. An apparatus used at a terminal, comprising:
- a receiving circuit, configured to receive scheduling information of a physical downlink shared channel (PDSCH) carrying system information, the scheduling information of the PDSCH being carried in a master information block (MIB) sent from a base station, wherein the scheduling information of the PDSCH is used for determining at least one kind of transmission information of the PDSCH as follows: the system information exists or does not exist, a subframe where the system information is transmitted, a transmission period of the subframe, a modulation and coding mode of the PDSCH, and resource allocation information of the PDSCH;
- a processing circuit, configured to:
  - when the transmission information of the PDSCH comprises the resource allocation information of the PDSCH, determine the resource allocation information of the PDSCH according to the scheduling information of the PDSCH, a maximum bandwidth supported by the terminal, and a cell identifier; and
  - determine, according to the scheduling information and a set of modulation and coding modes of the PDSCH corresponding to the system information, the modulation and coding mode of the PDSCH corresponding to the system information, for implementing modulation and coding processing for the system information.

4. The apparatus according to claim 3, wherein the system information is comprised in a system information block (SIB) carried on the PDSCH.

* * * * *